United States Patent
Li et al.

(10) Patent No.: US 12,425,561 B2
(45) Date of Patent: Sep. 23, 2025

(54) PHOTOGRAPHING METHOD AND DEVICE

(71) Applicant: Beijing Xiaomi Mobile Software Co., Ltd., Beijing (CN)

(72) Inventors: Guosheng Li, Beijing (CN); Minghua Zhang, Beijing (CN); Haohan Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 241 days.

(21) Appl. No.: 18/194,063

(22) Filed: Mar. 31, 2023

(65) Prior Publication Data
US 2024/0163416 A1    May 16, 2024

(30) Foreign Application Priority Data

Nov. 10, 2022 (CN) .......................... 202211405077.8
Nov. 10, 2022 (CN) .......................... 202211405452.9
Nov. 10, 2022 (CN) .......................... 202211406248.9

(51) Int. Cl.
*H04N 13/296* (2018.01)
*H04N 13/156* (2018.01)
*H04N 13/282* (2018.01)
*H04N 23/73* (2023.01)
*H04N 23/741* (2023.01)

(52) U.S. Cl.
CPC ......... *H04N 13/296* (2018.05); *H04N 13/156* (2018.05); *H04N 13/282* (2018.05); *H04N 23/73* (2023.01); *H04N 23/741* (2023.01)

(58) Field of Classification Search
CPC .. H04N 13/156; H04N 13/282; H04N 13/296; H04N 23/662; H04N 23/73; H04N 23/741; H04N 23/90; H04N 23/951
See application file for complete search history.

(56) References Cited

U.S. PATENT DOCUMENTS

| | | | | |
|---|---|---|---|---|
| 9,430,859 | B2* | 8/2016 | Kim | G06T 11/60 |
| 10,122,943 | B1* | 11/2018 | Chen | H04N 23/45 |
| 2004/0183915 | A1* | 9/2004 | Gotohda | H04N 23/63 |
| | | | | 348/E5.042 |
| 2011/0310219 | A1* | 12/2011 | Kim | H04N 7/188 |
| | | | | 348/36 |
| 2012/0188344 | A1* | 7/2012 | Imai | H04N 13/271 |
| | | | | 348/262 |
| 2013/0242058 | A1 | 9/2013 | Bae et al. | |
| 2013/0329016 | A1* | 12/2013 | Hwang | H04N 7/181 |
| | | | | 348/47 |
| 2015/0042836 | A1* | 2/2015 | Lin | H04N 25/58 |
| | | | | 348/222.1 |
| 2018/0241927 | A1* | 8/2018 | Chen | H04N 23/10 |

(Continued)

OTHER PUBLICATIONS

European Patent Office, Extended European Search Report issued in Application No. 23165996.2, dated Sep. 19, 2023, 16 pages.

*Primary Examiner* — Peter D Le

(74) *Attorney, Agent, or Firm* — Finnegan, Henderson, Farabow, Garrett & Dunner, L.L.P.

(57) ABSTRACT

A photographing method includes: in response to determining that a processing condition for multi-frame photographing is met, acquiring images from one or more second photographing apparatuses respectively to obtain a plurality of frames of images; and performing multi-frame fusion processing on the plurality of frames of images to obtain a photographed image.

13 Claims, 21 Drawing Sheets

(56) References Cited

U.S. PATENT DOCUMENTS

| | | | |
|---|---|---|---|
| 2019/0362477 A1* | 11/2019 | Rahmati | G06T 5/70 |
| 2021/0344826 A1* | 11/2021 | Wang | H04N 23/45 |
| 2022/0006945 A1 | 1/2022 | Bathija et al. | |
| 2023/0156301 A1* | 5/2023 | Feng | H04N 23/673 |
| | | | 348/262 |
| 2023/0262205 A1* | 8/2023 | Chen | H04N 13/268 |
| | | | 348/47 |
| 2023/0325999 A1* | 10/2023 | Dong | H04N 1/3871 |
| | | | 348/222.1 |
| 2024/0155236 A1* | 5/2024 | Cui | H04N 23/69 |
| 2024/0223911 A1* | 7/2024 | Cui | H04N 23/82 |

* cited by examiner

PHOTOGRAPHING METHOD AND DEVICE

CROSS-REFERENCE TO RELATED APPLICATIONS

This application is based on and claims priority to Chinese Patent Application Nos. 202211405077.8, 202211405452.9, and 202211406248.9, all filed on Nov. 10, 2022, the entire contents of all of which are incorporated herein by reference.

TECHNICAL FIELD

The present disclosure relates to a field of photographing, and more particularly to a photographing method and a photographing device.

BACKGROUND

In general, when users take photos with a terminal, they all use a single terminal to acquire different frames of images through the same camera, and then integrate the different frames of images to improve the imaging effect.

However, the mainstream multi-frame processing algorithm on the terminal has defects, and the performance of the terminal is limited, which leads to that the photographed images after multi-frame processing cannot meet the needs of the users in terms of definition, dynamic range and signal-to-noise ratio.

SUMMARY

According to a first aspect of the present disclosure, there is provided a photographing method applied to a first photographing apparatus, and the photographing method includes: in response to determining that a processing condition for multi-frame photographing is met, acquiring images from one or more second photographing apparatuses respectively to obtain a plurality of frames of images; and performing multi-frame fusion processing on the plurality of frames of images to obtain a photographed image.

According to a second aspect of the present disclosure, there is provided a photographing method applied to one or more second photographing apparatuses, and the photographing method includes: in response to determining that a processing condition for multi-frame photographing is met, transmitting images to a first photographing apparatus respectively; and acquiring a photographed image transmitted by the first photographing apparatus after performing multi-frame fusion processing on the images transmitted by one or more second photographing apparatuses.

According to a third aspect of the present disclosure, there is provided a photographing device, which includes: a processor, and a memory for storing instructions executable by the processor. When the instructions are executed, the processor is configured to: acquire images from one or more second photographing apparatuses respectively to obtain a plurality of frames of images, in response to determining that a processing condition for multi-frame photographing is met; and perform multi-frame fusion processing on the plurality of frames of images to obtain a photographed image.

It is to be appreciated that both the foregoing general description and the following detailed description are illustrative and explanatory only and do not limit the present disclosure.

BRIEF DESCRIPTION OF THE DRAWINGS

The accompanying drawings, which are incorporated in and constitute a part of this specification, illustrate embodiments consistent with the present disclosure and together with the description, serve to explain the principles of the present disclosure.

DETAILED DESCRIPTION

Figure 1:
FIG. 1 is a schematic view of a photographing method according to an embodiment of the present disclosure.

Example embodiments will be described in detail herein, examples of which are shown in the accompanying drawings. When the following description relates to the accompanying drawings, unless otherwise specified, same numbers in different accompanying drawings denote same or similar elements. Implementations described in the following example embodiments do not represent all implementations consistent with the present disclosure.

A photographing method provided by the present disclosure is applied to a field of photographing. In general, when users use a terminal to take images, they all use the same camera of one terminal to acquire different frames of images, and then integrate the different frames of images to improve the imaging effect, such as multi-frame noise reduction processing, high dynamic range processing and image depth detection processing. Although the terminal has built-in multi-frame algorithm for improving image quality, the mainstream multi-frame processing algorithms on the terminal have their own defects, and the computing performance of a single terminal is limited, which leads to the unsatisfactory effect of the final photographed image, i.e. the definition, noise reduction effect and dynamic range of the photographed image cannot meet the needs of the users.

In view of this, the present disclosure provides a photographing method, which uses a plurality of terminals for multi-terminal interconnection to synchronously photograph, so as to acquire a plurality of frames of images. Based on the plurality of frames of images, multi-frame fusion processing is performed to acquire the photographed photos. The terminals can be assisted to better acquire images, thereby improving the subsequent imaging quality.

For example, in the related art, image depth detection can be applied to intelligent terminals, such as mobile terminals with image acquisition apparatuses (such as cameras). The image depth detection plays an important role in the intelligent terminals, it can acquire the depth information, three-dimensional size and spatial information of environmental objects in real time, which provides technical support for sceneries of motion capture, three-dimensional modeling, indoor navigation and positioning, and has a wide range of consumer and industrial application requirements. The image acquisition apparatus of the intelligent terminal needs the support of the image depth detection technology in the fields of image bokeh, ranging and three-dimensional reconstruction. At present, the typically used image depth detection solutions on the intelligent terminals include Time of flight (TOF), Stereo-vision, Structured-light and Lidar, etc.

TOF needs a plurality of sampling and integration when detecting the phase deflection, which consumes a lot of resources and has low edge accuracy; the binocular visible light solution is a pure vision method, which requires a large amount of calculation, while Binocular vision matches images according to visual features, and the matching failure will be caused if no features exist, which it is not suitable for monotonous scenes lacking textures; with the increase of the detection distance, the precision of the structured light solution will become worse, and the structured light solution tends to be disturbed by ambient light; the cost of the solution of Lidar is relatively high. In addition, the resolution of the depth camera is relatively low at present, while the resolution of the ordinary RGB camera has reached more than 10 million pixels, which is dozens or even hundreds of times than that of the depth camera. Therefore, it is necessary to change the low-resolution depth images into the high-resolution depth images consistent with the RGB camera. To improve the resolution, it is necessary to use the texture, boundary and other content information of objects in color images, and it is difficult to keep the details in the process.

In view of this, the present disclosure specifically provides an image processing method, which controls a plurality of photographing apparatuses to acquire image depth information based on multi-terminal interconnection, and realizes operations such as background blurring, object segmentation, three-dimensional reconstruction and the like. Compared with a single photographing apparatus, it can improve the image depth accuracy and resolution without increasing the hardware cost.

For another example, in the related art, a plurality of images are continuously photographed by the same photographing apparatus at different times to synthesize an HDR image. Due to the different exposure time of the plurality of images continuously photographed by the same photographing apparatus at different times, the ghost image problem of the moving object is caused.

Specifically, the manners in which the HDR photographing method generates the HDR image mainly include multi-frame high dynamic range (MFHDR), digital overlap (DOL)-HDR and dual conversion gain (DCG) and the like.

The exposure time of each frame of MFHDR is different, so that the ghost image problem of the moving object cannot be solved theoretically. DOL-HDR, also known as staggered HDR, has a short exposure time interval between various frames, and the ghost image problem has been improved. However, each frame still has a different exposure time, and the ghost image problem still cannot be fundamentally solved. DCG solves the ghost image problem well, but the exposure ratio is limited and the supported dynamic range is limited.

In view of this, the present disclosure also specifically provides a method for generating the HDR image, which synchronously photographs a plurality of images for generating the HDR image based on a plurality of photographing apparatuses, and generates the HDR image through the images synchronously photographed by the plurality of photographing apparatuses, thereby solving the ghost image problem in the images.

Since the single photographing apparatus cannot photograph images with different exposure ratios at the same time, one photographing apparatus is used as a master apparatus and one or more other photographing apparatuses are used as slave apparatuses, thus realizing the multi-terminal interconnection between the master apparatus and the slave apparatuses. The master apparatus and the slave apparatuses synchronously photograph images with different exposure ratios, and integrate the photographed images into a high dynamic range image.

For the convenience of description, the master apparatus of the plurality of photographing apparatuses is called a first photographing apparatus, and the slave apparatus is called a second photographing apparatus.

FIG. 1 is a schematic view of a photographing method according to an embodiment of the present disclosure. As shown in FIG. 1, the first photographing apparatus and the second photographing apparatus are used and a visual field of photographing is adjusted, so that the plurality of photographing apparatuses can photograph images with the same visual field.

In some embodiments of the present disclosure, the plurality of photographing apparatuses are used for depth image processing, and the first photographing apparatus controls a plurality of second photographing apparatuses to synchronously photograph a plurality of images according to their respective intrinsic parameters (a focal length, an image center, a distortion parameter and the like of the camera) and extrinsic parameters (rotation and translation information of the plurality of photographing apparatuses), and optical simulation, including depth of field, radius of circle of confusion, spot reconstruction, noise matching, etc., is performed in combination with the plurality of acquired depth images, so as to realize the image depth detection and also improve the depth accuracy and resolution of the image without increasing the hardware cost.

In other embodiments of the present disclosure, the plurality of photographing apparatuses are used to photograph high dynamic range (HDR) images, and the first photographing apparatus controls a plurality of second photographing apparatuses to photograph synchronously according to different exposure ratios, so as to acquire a plurality of images photographed according to different exposure ratios.

The photographing methods according to the embodiments of the present disclosure can be applied to photographing apparatuses such as mobile phones, tablet computers, all-in-one computers, notebook computers, desktop computers, digital cameras, camcorders and the like equipped with photographing devices.

In the embodiments of the present disclosure, the plurality of photographing apparatuses are connected by technologies such as Bluetooth, wireless local area network or NFC, so as to realize the multi-terminal interconnection. The main photographing apparatus which plays a controlling role is called the first photographing apparatus, and one or more auxiliary photographing apparatuses which are connected with the first photographing apparatus, receive a photographing instruction and synchronously photograph images are called the second photographing apparatus.

Figure 2:
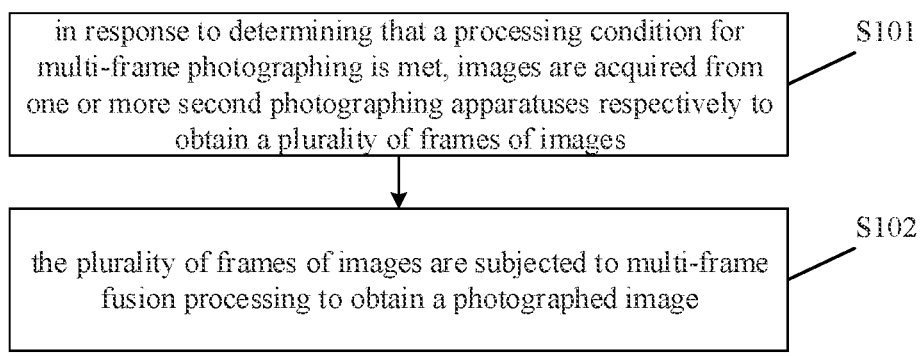
FIG. 2 is a flow chart of a photographing method applied to a first photographing apparatus according to an embodiment of the present disclosure.

FIG. 2 is a flow chart of a photographing method applied to the first photographing apparatus according to an embodiment. As shown in FIG. 2, the method includes steps S101 to S102.

At step S101, in response to determining that a processing condition for multi-frame photographing is met, images are acquired from one or more second photographing apparatuses respectively to obtain a plurality of frames of images.

In the embodiments of the present disclosure, it is judged whether the current scene or terminal environment triggers the multi-terminal interconnection photographing, and when the following situations occur, but not limited to these, it is determined that the processing condition for multi-frame photographing is met, and the multi-terminal interconnection is started: a low-end terminal does not have a multi-frame algorithm, so the image quality cannot be improved, and the multi-frame algorithm needs to be realized by means of the multi-terminal interconnection synchronous photographing; the image acquired by the single-terminal multi-frame processing of the terminal does not meet expectations, and the image quality effect needs to be further improved; there are inherent defects when the single terminal takes images, so it cannot solve the ghost image problem when taking images in a moving photographing scene.

At step S102, the plurality of frames of images are subjected to multi-frame fusion processing to obtain a photographed image.

In the embodiments of the present disclosure, the multi-frame fusion processing includes but is not limited to multi-frame processing methods such as multi-frame noise reduction processing, multi-frame HDR processing and multi-frame image depth detection processing.

In the embodiments of the present disclosure, when a requirement for the multi-frame fusion processing is met, the plurality of frames of images are acquired from the plurality of photographing apparatuses, and the plurality of acquired frames of images are subjected to the multi-frame fusion processing to acquire the photographed image.

In the embodiments of the present disclosure, after it is determined to perform the multi-frame fusion processing, the first photographing apparatus and the second photographing apparatus are multi-terminal interconnected and enter a synchronous state. The first photographing apparatus and the second photographing apparatus photograph synchronously to acquire the plurality of frames of images. After the plurality of acquired frames of images are subject to the fusion processing, the photographed image is acquired. According to the present disclosure, the plurality of frames of images are acquired by the plurality of photographing apparatuses, and the imaging effect of the multi-frame fusion is improved.

The following embodiments of the present disclosure further explains the process of acquiring images from one or more second photographing apparatuses to obtain the plurality of frames of images in the above embodiments.

Figure 3:
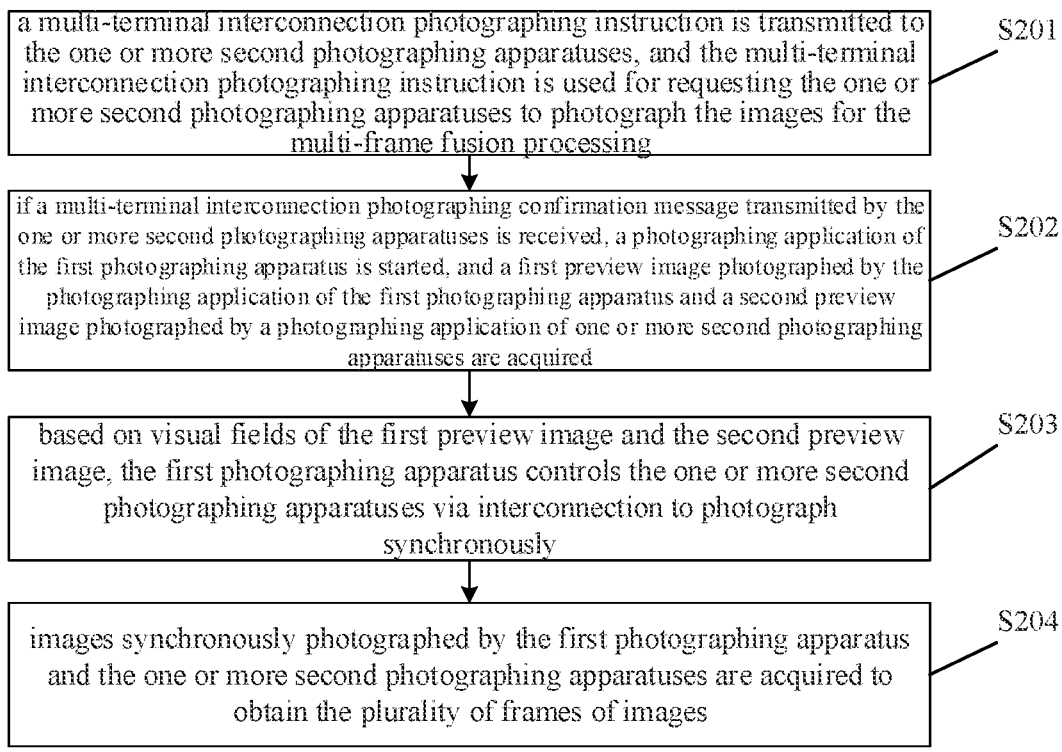
FIG. 3 is a flow chart illustrating a method of acquiring an image from a second photographing apparatus according to an embodiment of the present disclosure.

FIG. 3 is a flow chart illustrating a method of acquiring an image from one or more second photographing apparatus according to an embodiment. As shown in FIG. 3, the method includes steps S201 to S204.

At step S201, a multi-terminal interconnection photographing instruction is transmitted to the one or more second photographing apparatuses, and the multi-terminal interconnection photographing instruction is used for requesting the one or more second photographing apparatuses to photograph the image for the multi-frame fusion processing.

In the embodiments of the present disclosure, after it is determined to perform the multi-frame fusion processing, the first photographing apparatus invites the surrounding second photographing apparatuses to perform the multi-terminal interconnection photographing, and at this time, the surrounding apparatuses will receive an invitation UI prompt.

At step S202, if a multi-terminal interconnection photographing confirmation message transmitted by the one or more second photographing apparatuses is received, a photographing application of the first photographing apparatus is started, and a first preview image photographed by the photographing application of the first photographing apparatus and a second preview image photographed by a photographing application of one or more second photographing apparatuses are acquired.

When the one or more second photographing apparatuses receive the UI prompt, a confirm key on a display interface is clicked to enter a multi-terminal synchronization process of the multi-terminal interconnection photographing.

At step S203, based on visual fields of the first preview image and the second preview image, the first photographing apparatus controls the one or more second photographing apparatuses via interconnection to photograph synchronously.

In the embodiments of the present disclosure, the synchronous photographing is performed for the same angle of the same photographing target to acquire the photographed image. If the difference between the images acquired by the first photographing apparatus and the second photographing apparatus is greater than a certain threshold, the imaging effect will be affected. Therefore, the synchronous photographing can be performed only when the preview images of the first photographing apparatus and the second photographing apparatus are the same.

At step S204, images synchronously photographed by the first photographing apparatus and the one or more second photographing apparatuses are acquired to obtain the plurality of frames of images.

In the embodiments of the present disclosure, in response to the multi-terminal interconnection photographing instruction, after the first photographing apparatus receives the synchronization information fed back by the second photographing apparatus, the first photographing apparatus and the second photographing apparatus acquire the first preview image and the second preview image, respectively, and based on the visual fields of the preview images, the plurality of photographing apparatuses synchronously photograph to acquire the plurality of frames of images.

In the embodiments of the present disclosure, the plurality of photographing apparatuses start to enter the synchronization process of the plurality of photographing apparatuses after determining to perform the multi-terminal interconnection operation. The preview visual fields of the plurality of photographing apparatuses are acquired, respectively. When the synchronization is not achieved, the preview visual field of each photographing apparatus is different, and the positions and angles of the plurality of photographing apparatuses can be adjusted based on the preview visual fields until the plurality of photographing apparatuses are synchronized. Then, the plurality of apparatuses start to photograph synchronously.

The following embodiments of the present disclosure further explain the process of the first photographing apparatus controlling the one or more second photographing apparatuses via interconnection to photograph synchronously based on the visual fields of the first preview image and the second preview image in the above embodiments.

Figure 4:
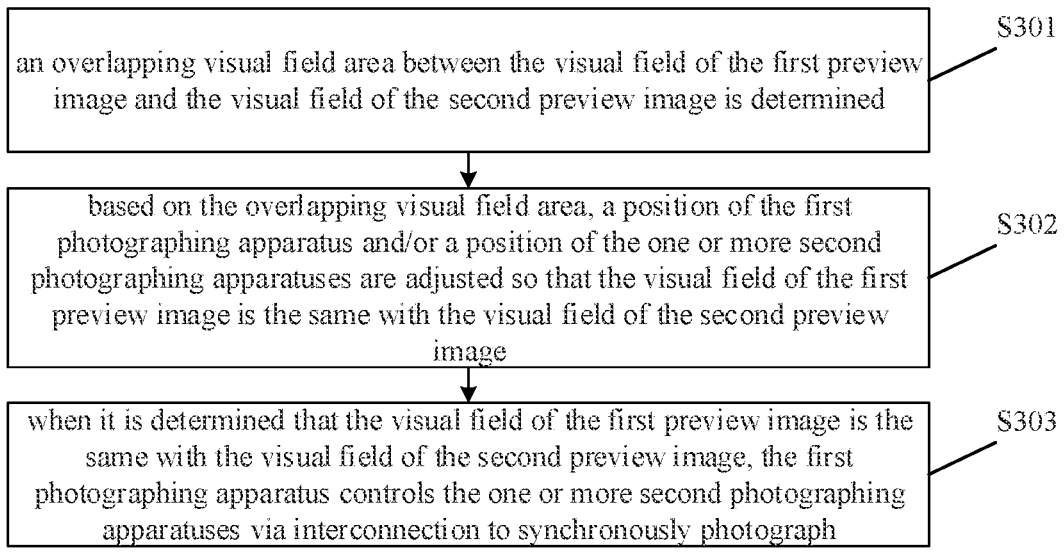
FIG. 4 is a flow chart of a method of photographing synchronously based on a preview image according to an embodiment of the present disclosure.

FIG. 4 is a flow chart of a method for synchronously photographing based on a preview image according to an embodiment. As shown in FIG. 4, the method includes steps S301 to S303.

At step S301, an overlapping visual field area between the visual field of the first preview image and the visual field of the second preview image is determined.

In the embodiments of the present disclosure, the overlapping visual field area between the first preview image and the second preview image is marked with blocks in UI interfaces of the first photographing apparatus and the second photographing apparatus.

At step S302, based on the overlapping visual field area, a position of the first photographing apparatus and/or a position of the one or more second photographing apparatuses are adjusted so that the visual field of the first preview image is the same with the visual field of the second preview image.

At step S303, when it is determined that the visual field of the first preview image is the same with the visual field of the second preview image, the first photographing apparatus controls the one or more second photographing apparatuses via interconnection to synchronously photograph.

In the embodiments of the present disclosure, the angles and positions of the photographing apparatuses are adjusted based on the overlapping visual field area between the first preview image and the second preview image until the visual field of the first preview image is the same with the visual field of the second preview image. In this way, the first photographing apparatus and the second photographing apparatus are synchronized and photograph synchronously to acquire the plurality of frames of images.

The following embodiments of the present disclosure further explain the process of adjusting the position of the first photographing apparatus and/or the position of the second photographing apparatus based on the overlapping visual field area in the above embodiments.

Figure 5:
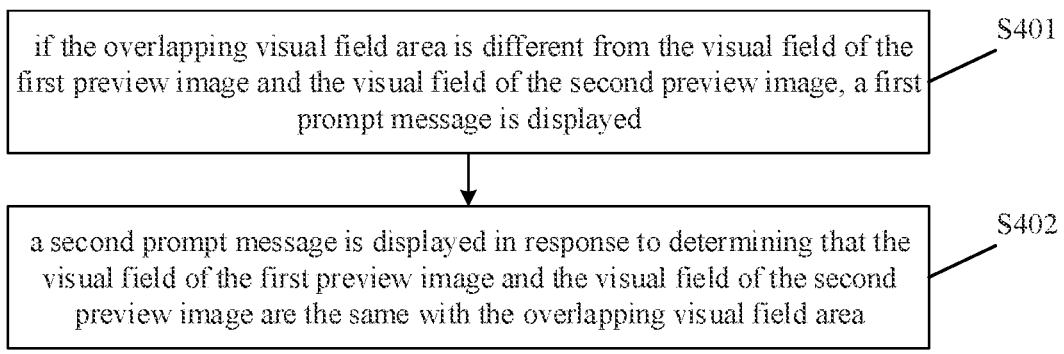
FIG. 5 is a flow chart of a method of adjusting a position of a photographing apparatus based on an overlapping view field area according to an embodiment of the present disclosure.

FIG. 5 is a flow chart of a method of adjusting a position of a photographing apparatus based on an overlapping visual field area according to an embodiment. As shown in FIG. 5, the method includes steps S401 to S402.

At step S401, if the overlapping visual field area is different from the visual field of the first preview image and the visual field of the second preview image, a first prompt message is displayed.

The first prompt message is used for prompting to adjust the position of the first photographing apparatus and/or the position of the second photographing apparatus, so that the visual field of the first preview image and the visual field of the second preview image are the same with the overlapping visual field area.

In the embodiments of the present disclosure, the first prompt message may be an arrow pointing to the overlapping visual field area. By displaying the arrow on the UI interface, it is indicated that the visual fields of the preview images of the first photographing apparatus and the second photographing apparatus move closer to the overlapping visual field area. It can be understood that when taking images of a photographing object, the photographing apparatus needs to adjust not only the absolute position, but also other parameters such as the angle, so the first prompt message may also be other forms of indication messages including the angle and other parameters.

At step S402, a second prompt message is displayed in response to determining that the visual field of the first preview image and the visual field of the second preview image are the same with the overlapping visual field area.

In the embodiments of the present disclosure, the second prompt message may be various symbols on the display interface of the terminal, or other forms of prompt messages such as voice and vibration, so as to remind the user when the photographing apparatus is adjusted to a specified position.

The second prompt message is used to prompt that the visual field of the first preview image and the visual field of the second preview image are the same with the overlapping visual field area.

Figure 6:
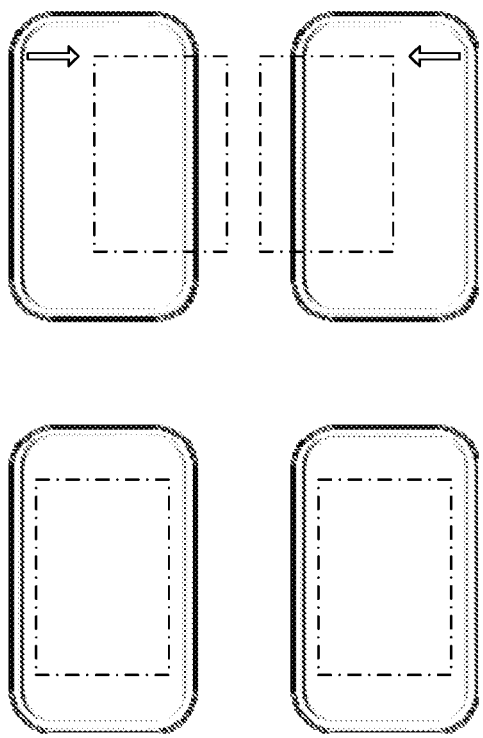
FIG. 6 is a schematic view of a method of adjusting a position of a photographing apparatus based on an overlapping visual field area according to an embodiment of the present disclosure.

In the embodiments of the present disclosure, as shown in the schematic view of the method for adjusting the position of the photographing apparatus based on the overlapping visual field area in FIG. 6, when the visual field of the first preview image and the visual field of the second preview image are different from the overlapping visual field area, it is prompted through the first prompt message to adjust the position of the first photographing apparatus and/or the position of the second photographing apparatus. When the visual field of the first preview image and the visual field of the second preview image are the same with the overlapping visual field area, the second prompt message is displayed, prompting that the first photographing apparatus and the second photographing apparatus are synchronized, and reminding the user to keep still until the synchronous photographing is completed.

The following embodiments of the present disclosure further explain the process of determining the overlapping visual field area between the first preview image and the second preview image in the above embodiments.

Figure 7:
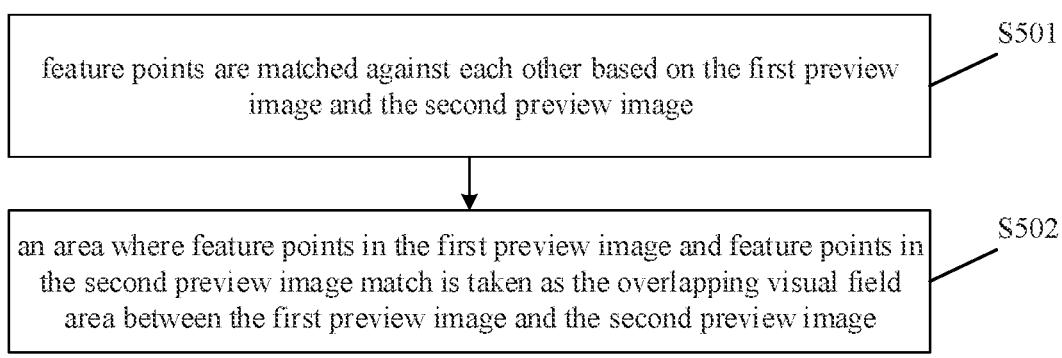
FIG. 7 is a flow chart of a method of determining an overlapping view field area between preview images according to an embodiment of the present disclosure.

FIG. 7 is a flow chart illustrating a method of determining an overlapping visual field area between preview images according to an embodiment. As shown in FIG. 7, the method includes steps S501 to S502.

At step S501, feature points are matched against each other based on the first preview image and the second preview image.

In the embodiments of the present disclosure, salient features of the photographing object in the visual fields of the first preview image and the second preview image are extracted as the feature points respectively, and the extracted feature points are matched against each other.

At step S502, an area where feature points in the first preview image and feature points in the second preview image match is taken as the overlapping visual field area between the first preview image and the second preview image.

In the embodiments of the present disclosure, the overlapping visual field area between the first preview image and the second preview image is determined by matching the feature points against each other.

In the embodiments of the present disclosure in which the plurality of photographing apparatuses are used for depth image processing, the multi-terminal interconnection photographing instruction includes a depth information detection instruction, which is used for controlling one or more second photographing apparatuses to photograph a plurality of frames of depth images.

Figure 8:
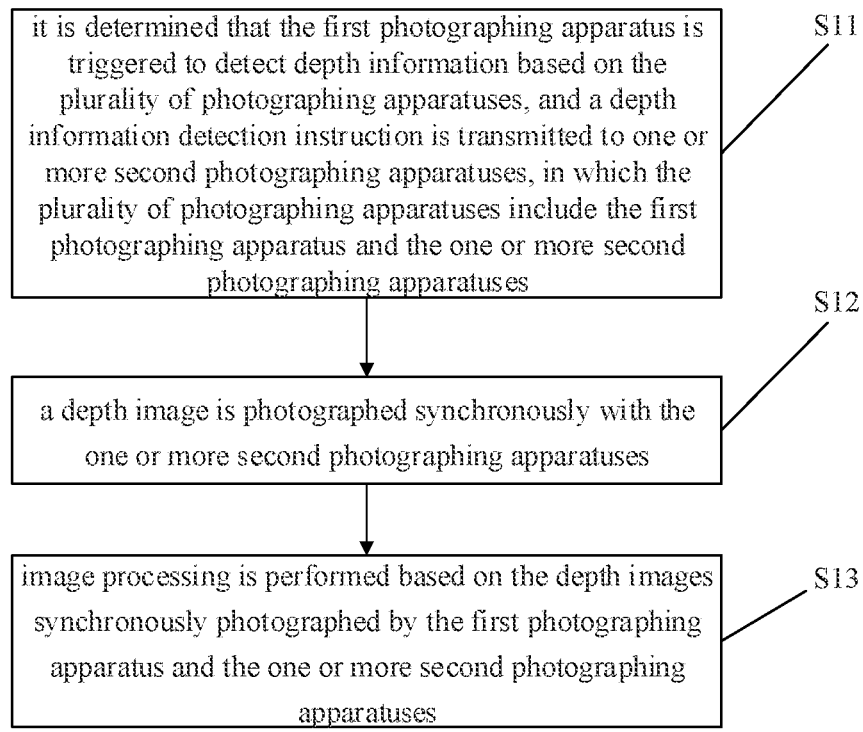
FIG. 8 is a flow chart of a photographing method according to an embodiment of the present disclosure.

FIG. 8 is a flow chart of a photographing method according to an embodiment. As shown in FIG. 8, the method is used for the first photographing apparatus and includes the following steps.

At step S11, it is determined that the first photographing apparatus is triggered to detect depth information based on the plurality of photographing apparatuses, and a depth information detection instruction is transmitted to one or more second photographing apparatuses, in which the plurality of photographing apparatuses include the first photographing apparatus and the one or more second photographing apparatuses.

At step S12, a depth image is photographed synchronously with the one or more second photographing apparatuses. It can be understood that this method is applied to the first photographing apparatus, that is, the first photographing apparatus photographs the depth image synchronously with the one or more second photographing apparatuses.

At step S13, image processing is performed based on the depth images synchronously photographed by the first photographing apparatus and the one or more second photographing apparatuses.

In the embodiments of the present disclosure, the first photographing apparatus transmits the depth information detection instruction to the one or more second photographing apparatuses, and controls the one or more second photographing apparatuses to synchronously photograph the depth images; based on a plurality of depth images photographed synchronously, the depth image processing is carried out. According to the present disclosure, the depth images are photographed synchronously by the plurality of photographing apparatuses, so that the time delay problem can be avoided, and hence the high-precision and high-resolution depth image information can be realized.

In the embodiments of the present disclosure, the first photographing apparatus and the one or more second photographing apparatuses are multi-terminal interconnected by manual or automatic connection. In general, 2 to 8 sets of photographing apparatuses are selected and controlled to synchronously photograph 2 to 8 images according to the photographing instruction set by the first photographing apparatus, while the present disclosure is not limited to this.

Taking out-of-focus imaging (bokeh) as an example, the out-of-focus imaging can be understood as the imaging of the blurred part outside the focus, which is also called virtual image and defocus. In a rear-photographing portrait mode of the photographing apparatus, due to the limited space of the photographing apparatus, it is necessary to use two lenses for photographing. Bokeh of the single photographing apparatus needs to use a super wide-angle lens and a telephoto lens to photograph images, while the plurality of photographing apparatuses can use the bokeh image algorithm to process the images taken by main lenses of the plurality of photographing apparatuses to acquire depthmap information. That is, the plurality of photographing apparatuses photograph from a plurality of view angles, judge a distance between the object and the lens according to the parallax, extract the depth information of the image according to the distance, and blur it to achieve a blurred effect.

Taking multi-view-angle depth reconstruction as an example, a middle frame is selected from N frames of reference images photographed by the plurality of photographing apparatuses as a reference frame of a main view angle, the motion information is extracted from the left and right frames of images to restore the scene expressed by the main view, and the scene content expressed by the main view angle is used to blur the background. That is, the reference image of the main view angle photographed by the first photographing apparatus is taken as a reference image, the reference image photographed by the second photographing apparatus is taken as an auxiliary image, and the image depth processing is carried out to acquire the blurred depth image.

In the embodiments of the present disclosure, limited by the image processing capability and computing capability of the hardware of the first photographing apparatus, the first photographing apparatus can upload the image photographed by itself and one or more received images photographed by the second photographing apparatus to an image processing server for image processing. Or, the first photographing apparatus has sufficient image processing capability and computing capability, and the image depth processing of the plurality of images is performed through a build-in image processing software of the first photographing apparatus.

According to the embodiments of the present disclosure, after the first photographing apparatus transmits the instruction to the second photographing apparatus, it receives the synchronization information fed back by the second photographing apparatus, and controls the second photographing apparatus to synchronously photograph the depth image based on the synchronization information.

Figure 9:
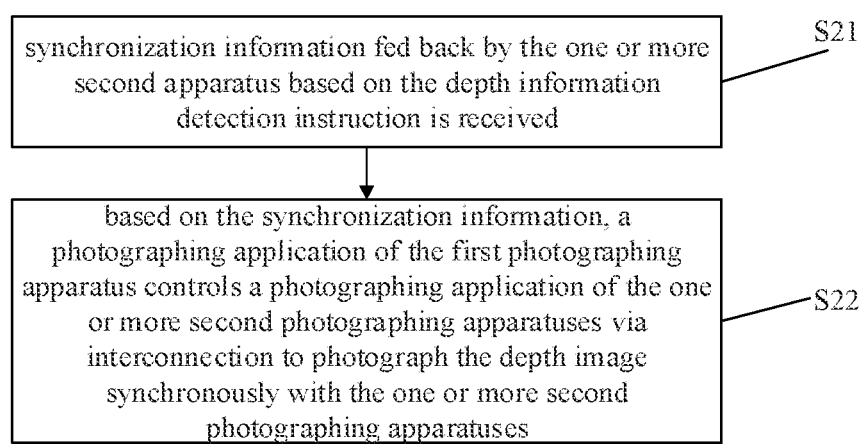
FIG. 9 is a flow chart of a photographing method according to an embodiment of the present disclosure.

FIG. 9 is a flow chart of a method of photographing a depth image synchronously with one or more second photographing apparatuses according to an embodiment. As shown in FIG. 9, the method includes the following steps.

At step S21, synchronization information fed back by the one or more second photographing apparatuses based on the depth information detection instruction is received.

In the embodiments of the present disclosure, the first photographing apparatus and the second photographing apparatus are connected through Bluetooth, WLAN or NFC to realize information communication, the first photographing apparatus transmits the depth information detection instruction to the one or more second photographing apparatuses. The depth information detection instruction includes intrinsic and extrinsic parameter information and synchronization information. After receiving the instruction, the one or more second photographing apparatuses feed back the synchronization information to the first photographing apparatus, and the first photographing apparatus receives the synchronization information fed back. The synchronization information is used to inform the first photographing apparatus that a multi-terminal interconnection channel has been established among the apparatuses and the second photographing apparatus is ready.

At step S22, based on the synchronization information, a photographing application of the first photographing apparatus controls a photographing application of the one or more second photographing apparatuses via interconnection to photograph the depth image synchronously with the one or more second photographing apparatuses.

In the embodiments of the present disclosure, the synchronization information includes various items of information and the number of the second photographing apparatuses photographing synchronously with the first photographing apparatus.

The second photographing apparatus may have the same model as the first photographing apparatus, or may be a mobile phone and other apparatuses having a different model. A photographing pixel resolution of each apparatus may be the same or different. Each photographing apparatus photographs synchronously, which can ensure that the images captured by all the photographing apparatuses during each photographing relate to the scene at the same moment, so as to facilitate the subsequent image processing.

According to the embodiments of the present disclosure, before photographing the depth image, it is necessary to calibrate the photographing apparatuses and determine the intrinsic parameters and extrinsic parameters of the first photographing apparatus and the second photographing apparatus, respectively.

Figure 10:
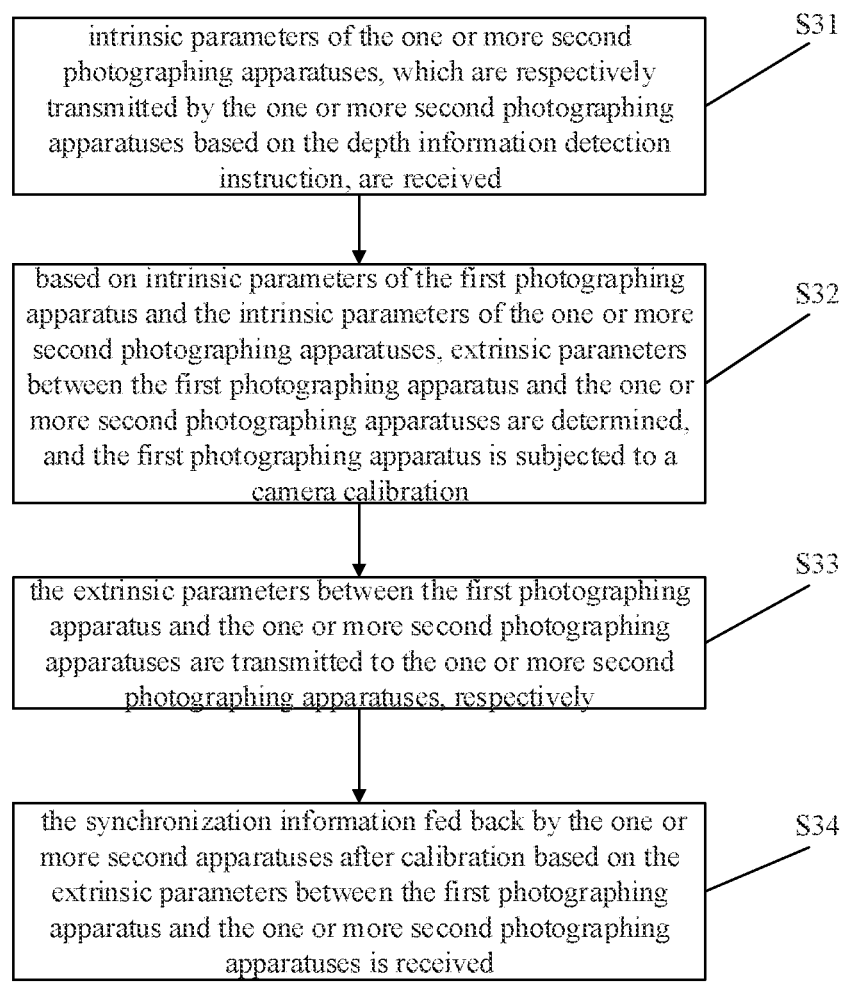
FIG. 10 is a flow chart of a method of determining intrinsic and extrinsic parameters of a photographing apparatus and calibrating the photographing apparatus according to an embodiment of the present disclosure.

FIG. 10 is a flow chart of a method of receiving the synchronization information fed back by the one or more second photographing apparatuses based on the depth information detection instruction according to an embodiment. As shown in FIG. 10, the method includes the following steps.

At step S31, intrinsic parameters of the one or more second photographing apparatuses, which are respectively transmitted by the one or more second photographing apparatuses based on the depth information detection instruction, are received.

In the embodiments of the present disclosure, it is necessary to determine the intrinsic parameter of the photographing apparatus, and the intrinsic parameter includes the focal length, image center, distortion parameters and the like of the camera, and the following is an intrinsic parameter matrix:

$$\begin{bmatrix} f_x & \gamma & u_0 & 0 \\ 0 & f_y & v_0 & 0 \\ 0 & 0 & 1 & 0 \end{bmatrix}$$

The intrinsic parameter of the photographing apparatus includes the followings: f is the focal length in millimeters; $f_x$ is a length of the focal length in a x-axis direction, which is described by using pixels; $f_y$ is a length of the focal length in a y-axis direction, which is described by using pixels; $u_0$ and $v_0$ are principle point coordinates (relative to an imaging plane) whose units are also pixels; $\gamma$ is a tilt parameter of a coordinate axis, which is 0 in an ideal case. The intrinsic parameter matrix is an attribute of the camera itself, and these parameters can be acquired by calibration.

At step S32, based on intrinsic parameters of the first photographing apparatus and the intrinsic parameters of the one or more second photographing apparatuses, extrinsic parameters between the first photographing apparatus and the one or more second photographing apparatuses are determined, and the first photographing apparatus is subjected to a camera calibration.

In the embodiments of the present disclosure, it is necessary to determine the extrinsic parameter of the photographing apparatus, the extrinsic parameter includes rotation and translation information of the plurality of photographing apparatuses, and the following is an extrinsic parameter matrix:

$$\begin{bmatrix} R & T \\ 0 & 1 \end{bmatrix}$$

The extrinsic parameter of the photographing apparatus is a description of a world coordinate system in a camera coordinate system. R is a rotation parameter, which is a product of rotation matrixes of respective axis, in which the rotation parameter of each axis is ($\phi$, $\omega$, $\theta$). T is a translation parameter (Tx, Ty, Tz).

In addition, the calibration of the photographing apparatus is the pre-order work of the multi-view-angle depth image photographing, and its purpose is to determine the intrinsic parameters, extrinsic parameters and distortion parameters of the camera.

At step S33, the extrinsic parameters between the first photographing apparatus and the one or more second photographing apparatuses are transmitted to the one or more second photographing apparatuses, respectively.

In the embodiments of the present disclosure, the image processing algorithm including bokeh photographing, such as ranging, object separation and three-dimensional reconstruction, requires the first photographing apparatus and the one or more second photographing apparatuses to set corresponding intrinsic parameters and extrinsic parameters.

At step S34, the synchronization information fed back by the one or more second photographing apparatuses after calibration based on the extrinsic parameters between the first photographing apparatus and the one or more second photographing apparatuses is received.

In the embodiments of the present disclosure, the first photographing apparatus receives the intrinsic parameters of the one or more second photographing apparatuses respectively transmitted by the one or more second photographing apparatuses based on the depth information detection instruction, and the intrinsic parameters include the focal length, image center, distortion parameters and the like of the camera; based on the intrinsic parameters, the extrinsic parameters between the first photographing apparatus and the one or more second photographing apparatuses are determined, the extrinsic parameters include the rotation and translation information of the plurality of photographing apparatuses, and the first photographing apparatus is subjected to the camera calibration. The first photographing apparatus transmits the extrinsic parameters between the first photographing apparatus and the one or more second photographing apparatuses to the one or more second photographing apparatuses, respectively; the first photographing apparatus receives the synchronization information fed back by the one or more second photographing apparatuses after the one or more second photographing apparatuses are calibrated based on the extrinsic parameters between the first photographing apparatus and the one or more second photographing apparatuses. After the synchronization information is acquired, the first photographing apparatus controls two or more second photographing apparatuses to photograph the scene at the same time.

For example, the plurality of photographing apparatuses can be used to photograph the same scene from a plurality of angles, and the distance from the point in the scene to the photographing apparatus can be calculated by triangulation and other methods, so as to restore the depth of the scene.

According to the embodiments of the present disclosure, it is necessary to make sure that the first photographing apparatus and the second photographing apparatus are in the same photographing visual field before taking the depth image.

Figure 11:
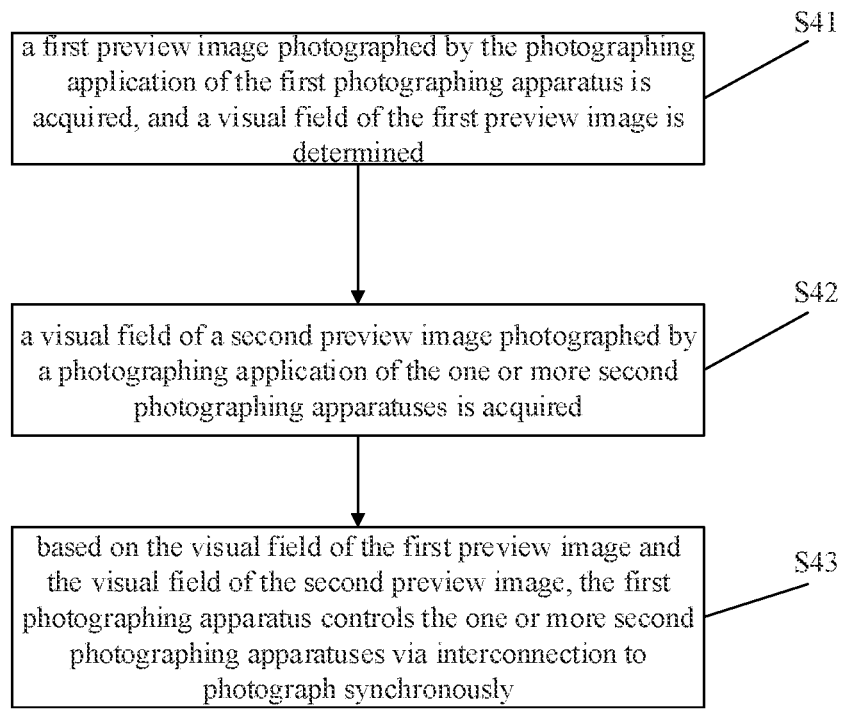
FIG. 11 is a flow chart of a method of determining a same visual field of a preview image according to an embodiment of the present disclosure.

FIG. 11 is a flow chart of a method for determining the same visual field of the preview image according to an embodiment. As shown in FIG. 11, the method includes the following steps.

At step S41, a first preview image photographed by the photographing application of the first photographing apparatus is acquired, and a visual field of the first preview image is determined.

At step S42, a visual field of a second preview image photographed by a photographing application of the one or more second photographing apparatuses is acquired.

At step S43, based on the visual field of the first preview image and the visual field of the second preview image, the first photographing apparatus controls the one or more second photographing apparatuses via interconnection to photograph synchronously.

In the embodiments of the present disclosure, the photographing application of the first photographing apparatus may be the same with or different from the photographing application of the second photographing apparatus. The first preview image photographed by the photographing application of the first photographing apparatus is displayed on a display screen of the first photographing apparatus, the first preview image is a main image for subsequent photographing, and its visual field is determined as a reference visual field. The second preview image photographed by the photographing application of the one or more second photographing apparatuses is displayed on a display screen of the second photographing apparatus, and its visual field is determined. The second photographing apparatus corresponding to the second preview image having the same visual field as the first preview image is determined through human eye observation or computer image matching technology as the second photographing apparatus photographing synchronously with the first photographing apparatus. By adjusting and keeping the visual field of the first preview image of the first photographing apparatus and the visual field of the second preview image of the second photographing apparatus the same, images with the same visual field can be photographed, which facilitates the depth processing of the plurality of images.

According to the embodiments of the present disclosure, the specific method of the first photographing apparatus controlling the one or more second photographing apparatuses via interconnection to photograph synchronously based on the visual field of the first preview image and the visual field of the second preview image is the same with that shown in FIGS. 4, 5 and 7, and will not be repeated here.

In some embodiments of the present disclosure, before determining the second photographing apparatus corresponding to the second preview image having the same visual field as the first preview image, it is necessary to determine the overlapping visual field area between the visual field of the first preview image and the visual field of the second preview image, and based on the overlapping visual field area, the position of the first photographing apparatus and/or the position of the second photographing apparatus are adjusted, so that the visual field of the first preview image is the same with the visual field of the second preview image. That is, all the one or more second photographing apparatuses photograph synchronously with the first photographing apparatus in these embodiments.

In the embodiments of the present disclosure, after receiving a focusing point coordinate fed back by the second photographing apparatus, the first photographing apparatus carries out the optical simulation in combination with the depth images acquired by itself, including depth of field, radius of circle of confusion, spot reconstruction, noise matching, etc., to acquire the depth image after the depth image processing.

As shown in FIG. 6, when the visual fields of the images basically overlap, the mobile phone prompts the user to keep still, and prompts to press the photographing button of the main mobile phone to photograph, while other multi-terminal interconnected mobile phones remain still.

In addition, the photographing apparatus is fixed to a rotatable bracket, and the bracket can be adjusted manually or electrically, so that the visual fields of the images of the two mobile phones get consistent.

In the embodiments of the present disclosure in which the plurality of photographing apparatuses are used to photograph high dynamic range (HDR) images, the multi-terminal interconnection photographing instruction includes a high dynamic range image generation instruction, and the high dynamic range image generation instruction is used to control the second photographing apparatuses to photograph a plurality of frames of images synchronously.

Figure 12:
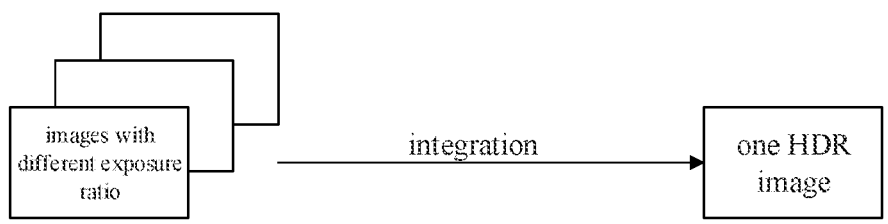
FIG. 12 is a schematic view of a photographing method according to an embodiment of the present disclosure.

FIG. 12 is a schematic view of a method for generating a high dynamic range image according to an embodiment of the present disclosure. As shown in FIG. 12, through the multi-terminal interconnection, the first photographing apparatus controls the second photographing apparatuses to perform exposure photographing with different exposure ratios at the same time, so as to acquire a plurality of images with different exposure ratios and integrate them into an HDR image, thus solving the ghost image problem of HDR while achieving the high dynamic range.

Figure 13:
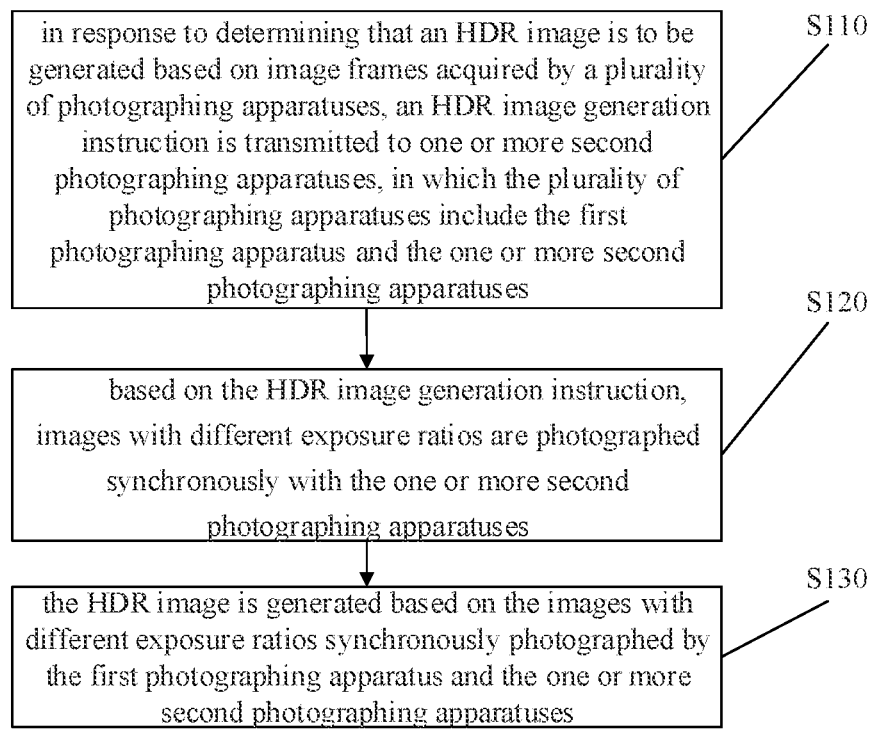
FIG. 13 is a flow chart of a photographing method according to an embodiment of the present disclosure.

FIG. 13 is a flow chart of a photographing method according to an embodiment. As shown in FIG. 13, the method is used for the first photographing apparatus and includes the following steps.

At step S110, in response to determining that an HDR image is to be generated based on image frames acquired by a plurality of photographing apparatuses, an HDR image generation instruction is transmitted to one or more second photographing apparatuses, in which the plurality of photographing apparatuses include the first photographing apparatus and the one or more second photographing apparatuses.

At step S120, based on the HDR image generation instruction, images with different exposure ratios are photographed synchronously with the one or more second photographing apparatuses.

At step S130, the HDR image is generated based on the images with different exposure ratios synchronously photographed by the first photographing apparatus and the one or more second photographing apparatuses.

By determining that the first photographing apparatus and the one or more second photographing apparatuses enter an HDR image photographing scene, the first photographing apparatus transmits the HDR image generation instruction to the one or more second photographing apparatuses and controls the one or more second photographing apparatuses to synchronously photograph the images with different exposure ratios; the HDR image is generated based on the images with different exposure ratios synchronously photographed by the first photographing apparatus and the one or more second photographing apparatuses. This method can effectively solve the ghost image problem in the image by synchronously photographing and combining the plurality of images with different exposure ratios.

In the embodiments of the present disclosure, the first photographing apparatus and the one or more second photographing apparatuses are multi-terminal interconnected by manual or automatic connection. Usually, 2 to 8 sets of photographing apparatuses are selected and controlled to synchronously photograph 2 to 8 images with different exposure ratios according to the photographing instruction set by the first photographing apparatus, while the present disclosure is not limited to this. Any image may be selected as a reference image to integrate the plurality of images with different exposure ratios into one HDR image.

In the embodiments of the present disclosure, limited by the image processing capability and computing capability of the hardware of the first photographing apparatus, the first photographing apparatus can upload the images photographed by itself and the received images photographed by the one or more second photographing apparatuses to an image processing server for HDR image processing and integration. Or, the first photographing apparatus has sufficient image processing capability and computing capability, and a built-in image processing software of the first photographing apparatus performs the HDR image processing and integration of the plurality of images with different exposure ratios.

The following is a method of the first photographing apparatus determining the number of the one or more second photographing apparatuses based on the received feedback information, assigning different exposures, and controlling the one or more second photographing apparatuses to synchronously photograph the images with different exposure ratios.

Figure 14:
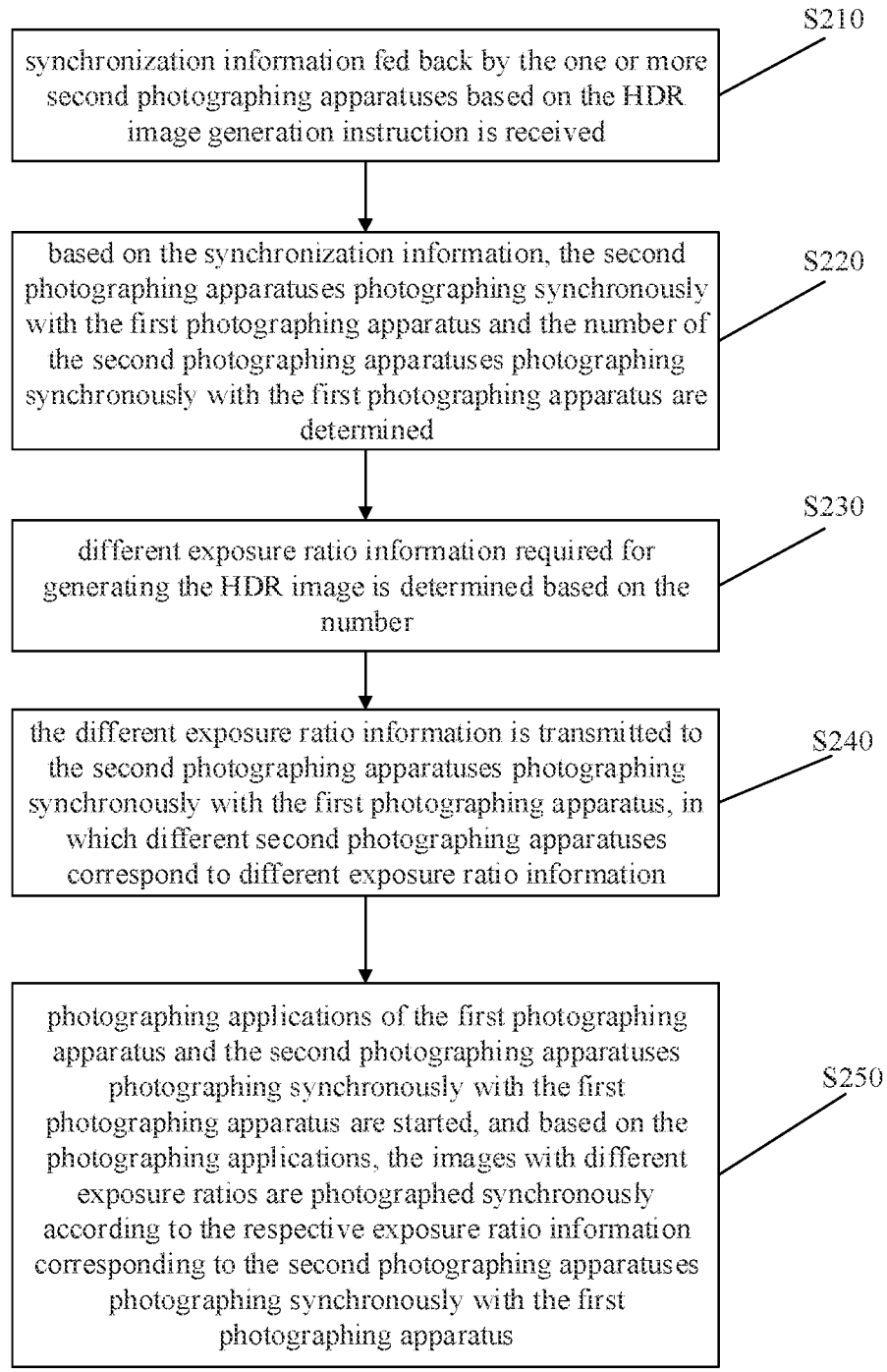
FIG. 14 is a flow chart of a photographing method according to an embodiment of the present disclosure.

FIG. 14 is a flow chart of a method for generating the HDR image according to an embodiment, which includes the following steps, as shown in FIG. 14.

At step S210, synchronization information fed back by the one or more second photographing apparatuses based on the HDR image generation instruction is received.

In the embodiments of the present disclosure, the first photographing apparatus and the second photographing apparatus are connected through Bluetooth, WLAN or NFC to realize information communication, the first photographing apparatus transmits the HDR image generation instruction to the one or more second photographing apparatuses, the instruction includes exposure information and synchronization information, the one or more second photographing apparatuses feeds back the synchronization information to the first photographing apparatus after receiving the instruction, and the first photographing apparatus receives the synchronization information fed back.

At step S220, based on the synchronization information, the second photographing apparatuses photographing synchronously with the first photographing apparatus and the number of the second photographing apparatuses photographing synchronously with the first photographing apparatus are determined. That is, at least part of the one or more second photographing apparatuses photographs synchronously with the first photographing apparatus.

It should be noted that the second photographing apparatus usually refers to the one or more second photographing apparatuses in elsewhere of the specification, unless specified otherwise, like at step S220.

In the embodiments of the present disclosure, the synchronization information includes various items of information and the number of the second photographing apparatuses photographing synchronously with the first photographing apparatus.

The second photographing apparatus is a mobile phone and other apparatuses having the same model as the first photographing apparatus, and the photographing pixel resolution of each apparatus should be consistent. Each photographing apparatus photographs synchronously, which can ensure that the images captured by all the photographing apparatuses during each photographing relate to the scene at the same time, so as to facilitate the subsequent image processing.

At step S230, different exposure ratio information required for generating the HDR image is determined based on the number.

In the embodiments of the present disclosure, the first photographing apparatus can set, modify and optimize the different exposure ratio information of itself and the second photographing apparatus according to preset algorithm, machine learning and image integration effect. For example, in the following table, different exposure ratios are set for each photographing apparatus according to the number of the first photographing apparatuses and the second photographing apparatus.

In the embodiments of the present disclosure, the HDR image cannot be completely displayed directly on the display, but details of different brightness areas can be displayed by adjusting the exposure. When the exposure is reduced, the details in a bright part of the HDR image are gradually displayed: conversely, when the exposure is increased, the details in a dark part are displayed. Therefore, different Exposure Values (EV) are set for different numbers of photographing apparatuses. For example, when there are two apparatuses, the exposure values of the apparatus are EV+ and EV−. The following table is only for the illustration that different exposure values are set for different numbers of photographing apparatuses, and EV+, EV++, EV−, EV−−, and EV0 are different exposure values. Generally, two photographing apparatuses will not be set with the same exposure value.

At step S310, a first preview image photographed by the photographing application of the first photographing apparatus is acquired, and a visual field of the first preview image is determined.

At step S320, a visual field of a second preview image photographed by the photographing application of the one or more second photographing apparatuses is acquired.

At step S330, the second photographing apparatus corresponding to the second preview image having the same visual field as the first preview image is determined as the second photographing apparatus photographing synchronously with the first photographing apparatus.

In the embodiments of the present disclosure, the first preview image photographed by the photographing application of the first photographing apparatus is acquired, the visual field of the first preview image is determined, and the first preview image is displayed on a display screen of the first photographing apparatus. The visual field of the second preview image photographed by the photographing application of the one or more second photographing apparatuses is acquired, and the second preview image is displayed on a display screen of the second photographing apparatus. The second photographing apparatus corresponding to the sec-

| | Number of apparatuses | | | | | | |
|---|---|---|---|---|---|---|---|
| | 2 sets | 3 sets | 4 sets | 5 sets | 6 sets | 7 sets | 8 sets |
| EV List | {EV+, EV−} | [EV+, EV0, EV−} | {EV+, EV0, EV0, EV−} | {EV+, EV0, EV0, EV0, EV−} | {EV+, EV0, EV0, EV0, EV0, EV−} | {EV+2, EV+, EV0, EV0, EV0, EV−, EV−−} | {EV+2, EV+, EV0, EV0, EV0, EV0, EV−, EV−−} |

At step S240, the different exposure ratio information is transmitted to the second photographing apparatuses photographing synchronously with the first photographing apparatus, in which different second photographing apparatuses correspond to different exposure ratio information.

In the embodiments of the present disclosure, the first photographing apparatus can set, modify and optimize the different exposure ratio information of itself and the second photographing apparatus according to preset algorithm, machine learning and image integration effect. The exposure ratio information corresponding to various apparatuses is transmitted to the second photographing apparatuses photographing synchronously with the first photographing apparatus.

At step S250, photographing applications of the first photographing apparatus and the second photographing apparatuses photographing synchronously with the first photographing apparatus are started, and based on the photographing applications, the images with different exposure ratios are photographed synchronously according to the respective exposure ratio information corresponding to the second photographing apparatuses photographing synchronously with the first photographing apparatus.

In the embodiments of the present disclosure, the photographing applications of the first photographing apparatus and the second photographing apparatus may be the same photographing application or different photographing applications, and after the photographing is completed synchronously, the photographed images are stored in memories of the apparatuses for the subsequent use.

Figure 15:
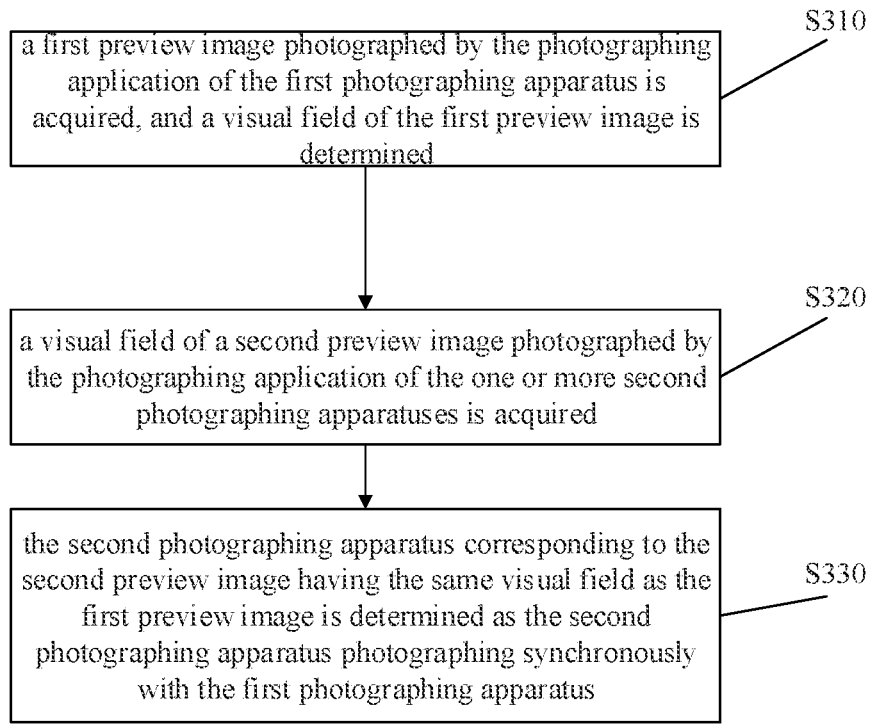
FIG. 15 is a flow chart of a method of determining a same visual field of a preview image according to an embodiment of the present disclosure.

FIG. 15 is a flow chart of a method for determining the same visual field of a preview image according to an embodiment. As shown in FIG. 15, the method includes the following steps.

ond preview image having the same visual field as the first preview image is determined through observation or image matching technology as the second photographing apparatus photographing synchronously with the first photographing apparatus. By adjusting and keeping the visual field of the first preview image of the first photographing apparatus and the visual field of the second preview image of the second photographing apparatus the same, images with the same visual field can be photographed, which facilitates integrating the plurality of images into the HDR image.

In the embodiments of the present disclosure, the method of adjusting and keeping the visual field of the first preview image of the first photographing apparatus and the visual field of the second preview image of the second photographing apparatus the same is the same with that shown in FIGS. 4, 5 and 7, and will not be repeated here.

Figure 16:
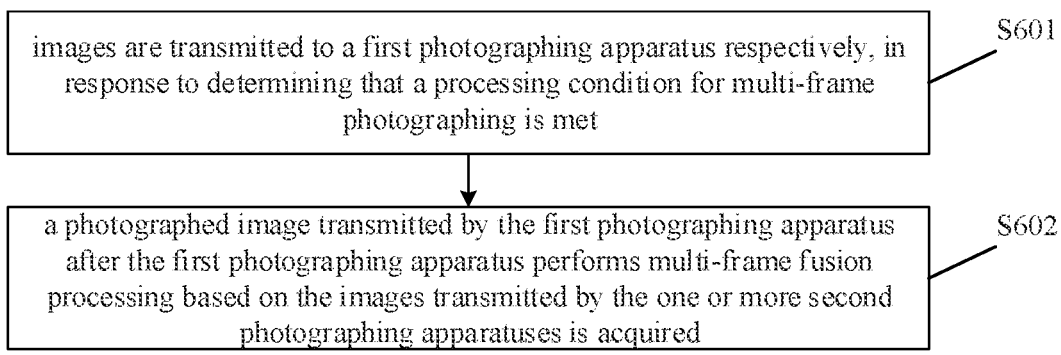
FIG. 16 is a flow chart of a photographing method applied to a second photographing apparatus according to an embodiment of the present disclosure.

The following embodiments of the present disclosure further explain a photographing method for the one or more second photographing apparatuses. FIG. 16 is a flow chart of a photographing method applied to the one or more second photographing apparatuses according to an embodiment. As shown in FIG. 16, the method includes steps S601 to S602.

At step S601, images are transmitted to a first photographing apparatus respectively, in response to determining that a processing condition for multi-frame photographing is met.

In the embodiments of the present disclosure, it is judged whether the current scene or terminal environment triggers the multi-terminal interconnection photographing, and when the following situations occur, but not limited to these, it is determined that the processing condition for multi-frame photographing is met, and the multi-terminal interconnection can be started: a low-end terminal does not have a multi-frame algorithm, so the image quality cannot be improved, and the multi-frame algorithm needs to be realized by means of the multi-terminal interconnection synchronous photographing; the image acquired by the single-terminal multi-frame processing of the terminal does not meet expectations, and the image quality effect needs to be further improved; there are inherent defects when the single terminal takes images, so it cannot solve the ghost image problem when taking images in a moving photographing scene.

At step S602, a photographed image transmitted by the first photographing apparatus after the first photographing apparatus performs multi-frame fusion processing based on the images transmitted by the one or more second photographing apparatuses is acquired.

In the embodiments of the present disclosure, the one or more second photographing apparatuses transmit the image to the first photographing apparatus when the processing condition for multi-frame photographing is met, and the multi-frame fusion processing is performed based on a plurality of frames of images of the first photographing apparatus and the second photographing apparatus to acquire the photographed image.

In the embodiments of the present disclosure, after it is determined to perform the multi-frame fusion processing, the first photographing apparatus and the second photographing apparatus enter a synchronous state and acquire the plurality of frames of images, in which the plurality of frames of images acquired by the second photographing apparatus are transmitted to the first photographing apparatus, and the first photographing apparatus performs the multi-frame fusion processing which includes, but is not limited to, multi-frame noise reduction, multi-frame HDR and image depth detection to acquire the photographed image.

The following embodiments of the present disclosure further explain the process of transmitting the image to the first photographing apparatus in the above embodiments.

Figure 17:
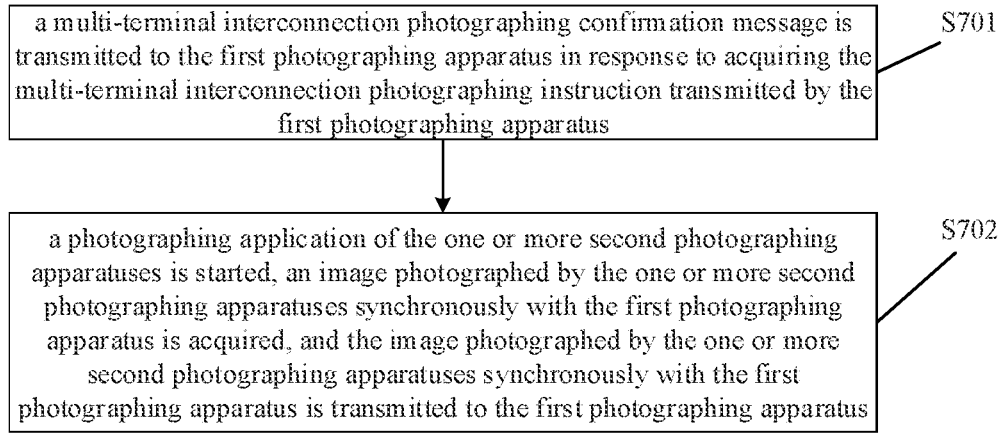
FIG. 17 is a flow chart of a method of a second photographing apparatus transmitting an image to a first photographing apparatus according to an embodiment of the present disclosure.

FIG. 17 is a flow chart of a method for the second photographing apparatus to transmit the image to the first photographing apparatus according to an embodiment. As shown in FIG. 17, the method includes steps S701 to S702.

At step S701, a multi-terminal interconnection photographing confirmation message is transmitted to the first photographing apparatus in response to acquiring the multi-terminal interconnection photographing instruction transmitted by the first photographing apparatus.

In the embodiments of the present disclosure, it is judged that the current scene or terminal environment can trigger the multi-terminal interconnection photographing and the multi-terminal interconnection is started. The first photographing apparatus invites the surrounding second photographing apparatus to perform the multi-terminal interconnection photographing, and at this time, the surrounding second photographing apparatus will receive an invitation UI prompt, and a confirm key can be clicked to feed back the confirmation message to the first photographing apparatus.

At step S702, a photographing application of the one or more second photographing apparatuses is started, an image photographed by the one or more second photographing apparatuses synchronously with the first photographing apparatus is acquired, and the image photographed by the one or more second photographing apparatuses synchronously with the first photographing apparatus is transmitted to the first photographing apparatus.

In the embodiments of the present disclosure, the second photographing apparatus feeds back the confirmation message based on the multi-terminal interconnection photographing instruction, enters the synchronous photographing process together with the first photographing apparatus, starts the photographing application, and synchronously acquires the plurality of frames of images. After acquiring the images, the second photographing apparatus transmits the acquired images to the first photographing apparatus.

In the embodiments of the present disclosure, after it is determined to perform the multi-frame fusion processing, the first photographing apparatus and the second photographing apparatus exchange information to determine to perform the synchronization. Preview visual fields of the first photographing apparatus and the second photographing apparatus are acquired respectively, the first photographing apparatus and the second photographing apparatus are adjusted based on the preview visual fields until the plurality of photographing apparatuses reach synchronization, and then the plurality of photographing apparatuses acquire the plurality of frames of images. The second photographing apparatus transmits the acquired images to the first photographing apparatus, and the first photographing apparatus performs the fusion processing on the plurality of frames of images to acquire the photographed image.

The following embodiments of the present disclosure further explain the process of starting the photographing application of the one or more second photographing apparatuses and acquiring the images photographed by the one or more second photographing apparatuses synchronously with the first photographing apparatus in the above embodiments.

Figure 18:
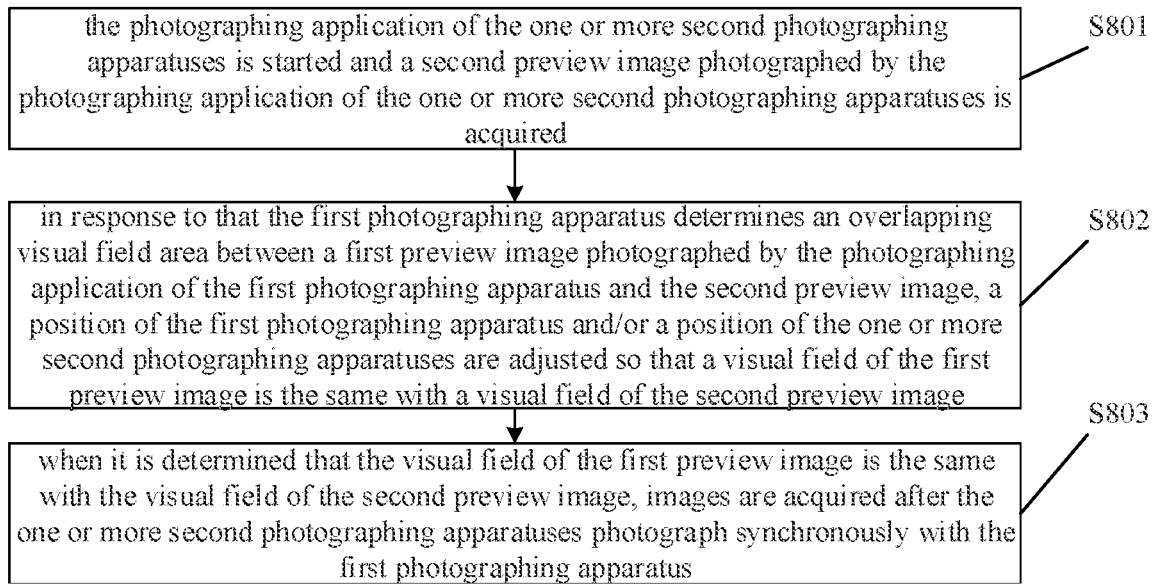
FIG. 18 is a flow chart of a method of starting a photographing application of a photographing apparatus to acquire an image after synchronous photographing according to an embodiment of the present disclosure.

FIG. 18 is a flow chart of a method for starting a photographing application of a photographing apparatus to acquire an image after synchronous photographing according to an embodiment. As shown in FIG. 18, the method includes steps S801 to S802.

At step S801, the photographing application of the one or more second photographing apparatuses is started and a second preview image photographed by the photographing application of the one or more second photographing apparatuses is acquired.

In the embodiments of the present disclosure, the plurality of photographing apparatuses start to enter the synchronization process of the plurality of photographing apparatuses after determining to perform the multi-terminal interconnection operation. The preview visual fields of the plurality of photographing apparatuses are acquired, respectively. When synchronization is not achieved, the preview visual fields of the respective photographing apparatuses are different, and the positions and angles of the plurality of photographing apparatuses can be adjusted based on the preview visual fields until the plurality of photographing apparatuses are synchronized, and then the plurality of photographing apparatuses start to photograph synchronously.

At step S802, in response to that the first photographing apparatus determines an overlapping visual field area between a first preview image photographed by the photographing application of the first photographing apparatus and the second preview image, a position of the first photographing apparatus and/or a position of the one or more second photographing apparatuses are adjusted so that a visual field of the first preview image is the same with a visual field of the second preview image.

In the embodiments of the present disclosure, the synchronous photographing is performed for the same view of the same photographing target to acquire the photographed image. If the difference between the images acquired by the first photographing apparatus and the second photographing apparatus is greater than a certain threshold, the imaging effect will be affected. Therefore, the synchronous photographing can be performed only when the preview images of the first photographing apparatus and the second photographing apparatus are the same.

At step S803, when it is determined that the visual field of the first preview image is the same with the visual field of the second preview image, images are acquired after the one or more second photographing apparatuses photograph synchronously with the first photographing apparatus.

In the embodiments of the present disclosure, the second photographing apparatus acquires the second preview image. The angles and positions of the photographing apparatuses are adjusted based on the overlapping visual field area between the first preview image and the second preview image until the visual field of the first preview image is the same with the visual field of the second preview image, so that the first photographing apparatus and the second photographing apparatus are synchronized.

The following embodiments of the present disclosure further explain the process of adjusting the position of the first photographing apparatus and/or the position of the second photographing apparatus in response to that the first photographing apparatus determines the overlapping visual field area between the first preview image photographed by the photographing application of the first photographing apparatus and the second preview image in the above embodiments.

Figure 19:
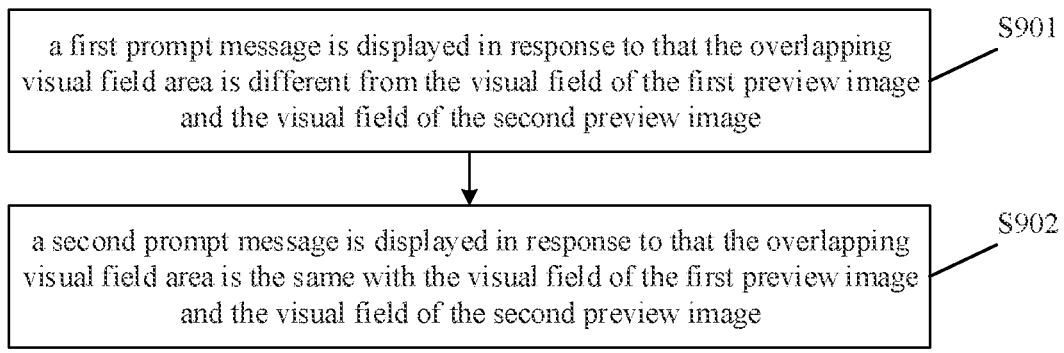
FIG. 19 is a flow chart of a method of adjusting a position of a photographing apparatus in response to an overlapping visual field area between preview images according to an embodiment of the present disclosure.

FIG. 19 is a flow chart illustrating a method of adjusting a position of a photographing apparatus in response to an overlapping visual field area between preview images according to an embodiment. As shown in FIG. 19, the method includes steps S901 to S902.

At step S901, a first prompt message is displayed in response to that the overlapping visual field area is different from the visual field of the first preview image and the visual field of the second preview image.

The first prompt message is used for prompting to adjust the position of the first photographing apparatus and/or the position of the second photographing apparatus, so that the visual field of the first preview image and the visual field of the second preview image are the same with the overlapping visual field area.

In the embodiments of the present disclosure, the first prompt message may be an arrow pointing to the overlapping visual field area. By displaying the arrow on the UI interface, it is indicated that the visual fields of the preview images of the first photographing apparatus and the second photographing apparatus move closer to the overlapping visual field area. It can be understood that when taking images of a photographing object, the photographing apparatus needs to adjust not only the absolute position, but also other parameters such as the angle, so the first prompt message may also be other forms of indication messages including the angle and other parameters.

At step S902, a second prompt message is displayed in response to that the overlapping visual field area is the same with the visual field of the first preview image and the visual field of the second preview image.

The second prompt message is used to prompt that the visual field of the first preview image and the visual field of the second preview image are the same with the overlapping visual field area.

In the embodiments of the present disclosure, the second prompt message may be various symbols on the display interface of the terminal, or other forms of prompt messages such as voice and vibration, so as to remind the user when the photographing apparatus is adjusted to a specified position.

In the embodiments of the present disclosure, as shown in the schematic view of the method for adjusting the position of the photographing apparatus based on the overlapping visual field area in FIG. 6, when the visual field of the first preview image and the visual field of the second preview image are different from the overlapping visual field area, it is prompted through the first prompt message to adjust the position of the first photographing apparatus and/or the position of the second photographing apparatus. When the visual field of the first preview image and the visual field of the second preview image are the same with the overlapping visual field area, the second prompt message is displayed, prompting that the first photographing apparatus and the second photographing apparatus are synchronized.

Here, the method for determining the overlapping visual field area between the preview images is the same with that described in FIG. 7, and will not be repeated here.

In the embodiments of the present disclosure, since there are certain requirements on the positions and angles of the plurality of terminals when the plurality of terminals photograph to acquire images of the same photographing object at the same time, the present disclosure proposes the interaction process among the plurality of interconnected photographing apparatuses and the process of how to guide the placements of the first photographing apparatus and the second photographing apparatus. It is judged whether the current scene or terminal environment triggers the multi-terminal interconnection photographing, and the multi-terminal interconnection may be started when the processing condition for multi-frame photographing is met, that is, when the following situations occur, but not limited to: a low-end terminal does not have a multi-frame algorithm, so the image quality cannot be improved, and the multi-frame algorithm needs to be realized by means of the multi-terminal interconnection synchronous photographing; the image acquired by the single-terminal multi-frame processing of the terminal does not meet expectations, and the image quality effect needs to be further improved; there are inherent defects when the single terminal takes images, so it cannot solve the ghost image problem when taking images in a moving photographing scene. The first photographing apparatus invites the surrounding second photographing apparatus to perform the multi-terminal interconnection photographing, and at this time, the surrounding second photographing apparatus will receive the invitation UI prompt, and a confirm key can be clicked to perform the multi-terminal interconnection photographing. In the multi-terminal interaction process before photographing, feature points are matched against each other through the preview frames of the first photographing apparatus and the second photographing apparatus after the cameras are turned on, the overlapping visual field area is marked by blocks in the preview images of the two terminals respectively, and the user of the first photographing apparatus and the second photographing apparatus is instructed to adjust the angles of the terminals by displaying arrows on the preview interfaces of the photographing apparatuses, so that the visual fields of the first photographing apparatus and the second photographing apparatus are kept consistent with the overlapping visual field area. After the visual fields of the first photographing apparatus and the second photographing apparatus basically overlap with the overlapping visual field area, the photographing apparatus displays the second prompt message, prompting that the synchronization has been completed, prompting the user to keep still, and prompting to press the photographing button of the first photographing apparatus to take images. In this case, the first photographing apparatus and the second photographing apparatus, which are multi-terminal interconnected, keep still to photograph synchronously and acquire a plurality of frames of images. After the plurality of frames of images are acquired, the second photographing apparatus transmits the acquired images to the first photographing apparatus, and the first photographing apparatus performs the multi-frame fusion processing based on the plurality of frames of images to acquire the photographed image.

In the embodiments of the present disclosure, the first photographing apparatus and the one or more second photographing apparatuses are interconnected, the interconnected first photographing apparatus and second photographing apparatus enter a synchronous state, simultaneously photograph and acquire the plurality of frames of images, and the images synchronously photographed by the terminals are integrated to improve the image quality.

In the embodiments in which the plurality of photographing apparatuses are used for depth image processing, the multi-terminal interconnection photographing instruction includes a depth information detection instruction, and the depth information detection instruction is used for controlling the one or more second photographing apparatuses to photograph a plurality of frames of depth images.

The following is a description of the process that the second photographing apparatus feeds back synchronization information based on the depth information detection instruction transmitted by the first photographing apparatus, adjusts the photographing visual field with respect to the first photographing apparatus, and photographs the depth image synchronously with the first photographing apparatus.

Figure 20:
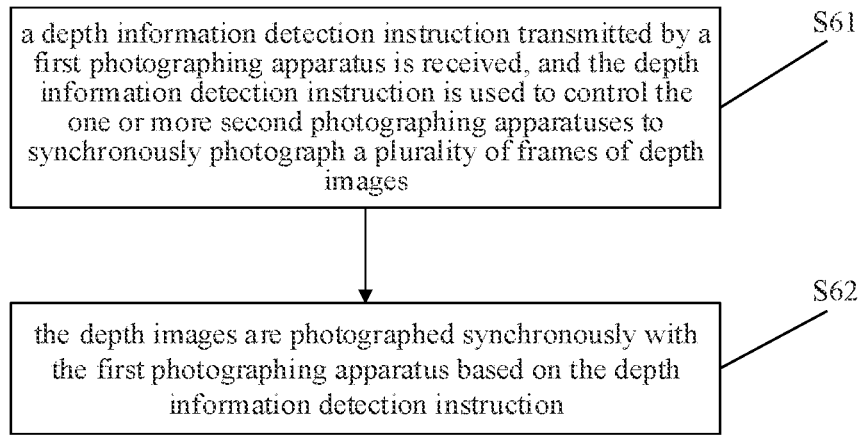
FIG. 20 is a flow chart of a photographing method according to an embodiment of the present disclosure.

FIG. 20 is a flow chart of a photographing method according to an embodiment. As shown in FIG. 20, the method is used for the one or more second photographing apparatuses, and includes the following steps.

At step S61, a depth information detection instruction transmitted by a first photographing apparatus is received, and the depth information detection instruction is used to control the one or more second photographing apparatuses to synchronously photograph a plurality of frames of depth images.

At step S62, the depth images are photographed synchronously with the first photographing apparatus based on the depth information detection instruction.

In the embodiments of the present disclosure, the second photographing apparatus is connected with the first photographing apparatus through Bluetooth, WLAN or NFC to realize information communication, the second photographing apparatus receives the depth information detection instruction transmitted by the first photographing apparatus, and the instruction includes intrinsic and extrinsic parameter information and synchronization information. The depth information detection instruction is used to control the second photographing apparatus to synchronously photograph the plurality of frames of depth images. Based on the depth information detection instruction, the second photographing apparatus photographs a plurality of images with different view angles synchronously with the first photographing apparatus, and transmits the plurality of images with different view angles photographed synchronously with the first photographing apparatus to the first photographing apparatus after the photographing is completed. According to the embodiments of the present disclosure, the plurality of depth images are photographed synchronously, which facilitates the subsequent corresponding image processing based on the plurality of depth images.

In the embodiments of the present disclosure, based on the depth information detection instruction, the second photographing apparatus feeds back the synchronization information to the first photographing apparatus, and the synchronization information is used to instruct the photographing application of the first photographing apparatus to control the photographing application of the one or more second photographing apparatuses via interconnection to synchronously photograph depth images. It should be understood that the second photographing apparatus informs the first photographing apparatus that the preparation work before photographing is ready, and the second photographing apparatus is to be controlled by the first photographing apparatus to synchronously photograph.

After completing the information synchronization and information sharing between the first photographing apparatus and the second photographing apparatus, it is necessary to determine the intrinsic and extrinsic parameters of the first photographing apparatus and the second photographing apparatus.

Figure 21:
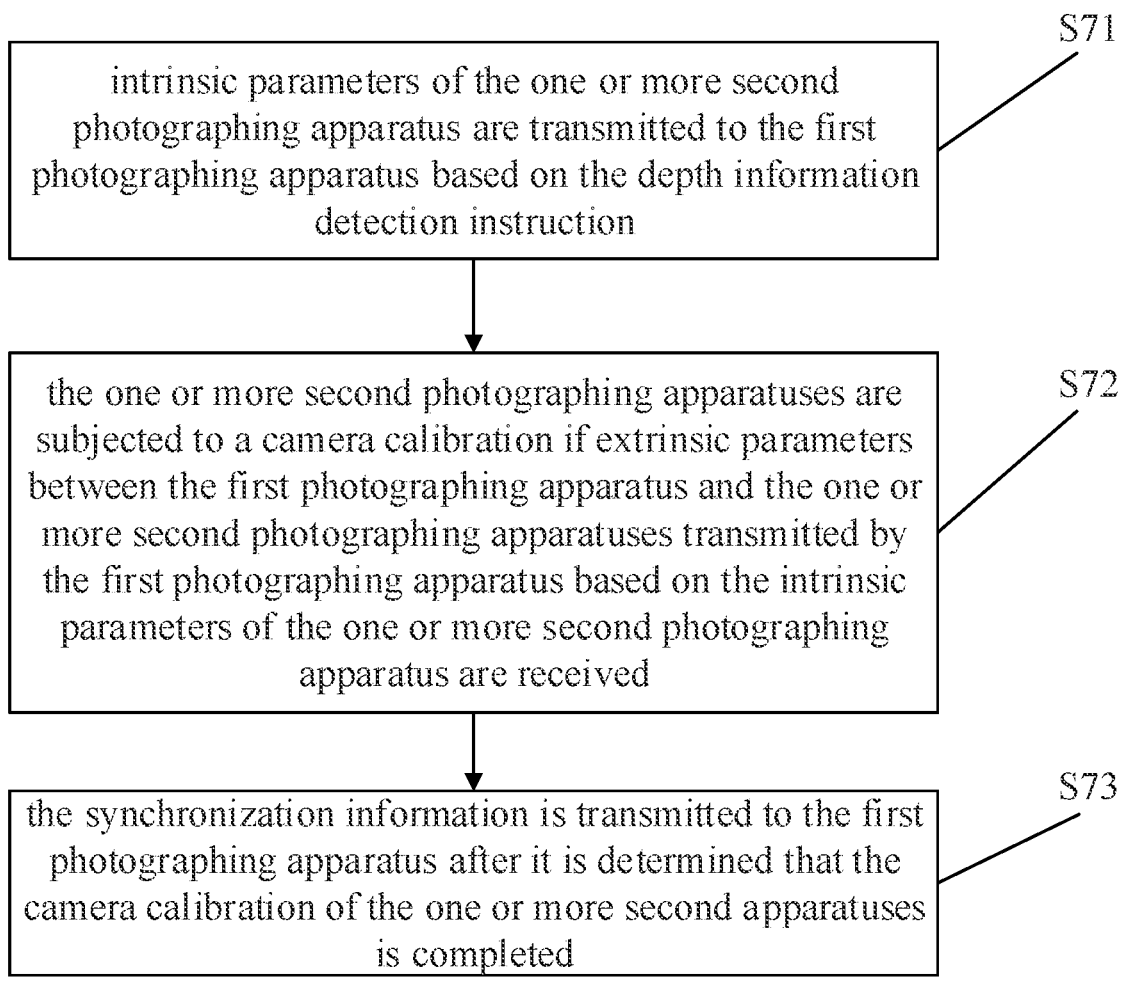
FIG. 21 is a flow chart of a photographing method according to an embodiment of the present disclosure.

FIG. 21 is a flow chart of a photographing method according to an embodiment. As shown in FIG. 20, the method includes the following steps.

At step S71, intrinsic parameters of the one or more second photographing apparatuses are transmitted to the first photographing apparatus based on the depth information detection instruction.

At step S72, the one or more second photographing apparatuses are subjected to a camera calibration if extrinsic parameters between the first photographing apparatus and the one or more second photographing apparatuses transmitted by the first photographing apparatus based on the intrinsic parameters of the one or more second photographing apparatuses are received.

In the embodiments of the present disclosure, the photographing apparatus is calibrated, which process is mainly intended to acquire the intrinsic parameters of the camera.

At step S73, the synchronization information is transmitted to the first photographing apparatus after it is determined that the camera calibration of the one or more second photographing apparatuses is completed.

In the embodiments of the present disclosure, based on the depth information detection instruction, the intrinsic parameters of the one or more second photographing apparatuses are transmitted to the first photographing apparatus. If the extrinsic parameters between the first photographing apparatus and the one or more second photographing apparatuses transmitted by the first photographing apparatus based on the intrinsic parameters of the one or more second photographing apparatuses are received, the second photographing apparatus is subjected to the camera calibration. After it is determined that the camera calibration of the second photographing apparatus is completed, the synchronization information is transmitted to the first photographing apparatus. The synchronization information is used to inform the first photographing apparatus that the next action can be taken.

Figure 22:
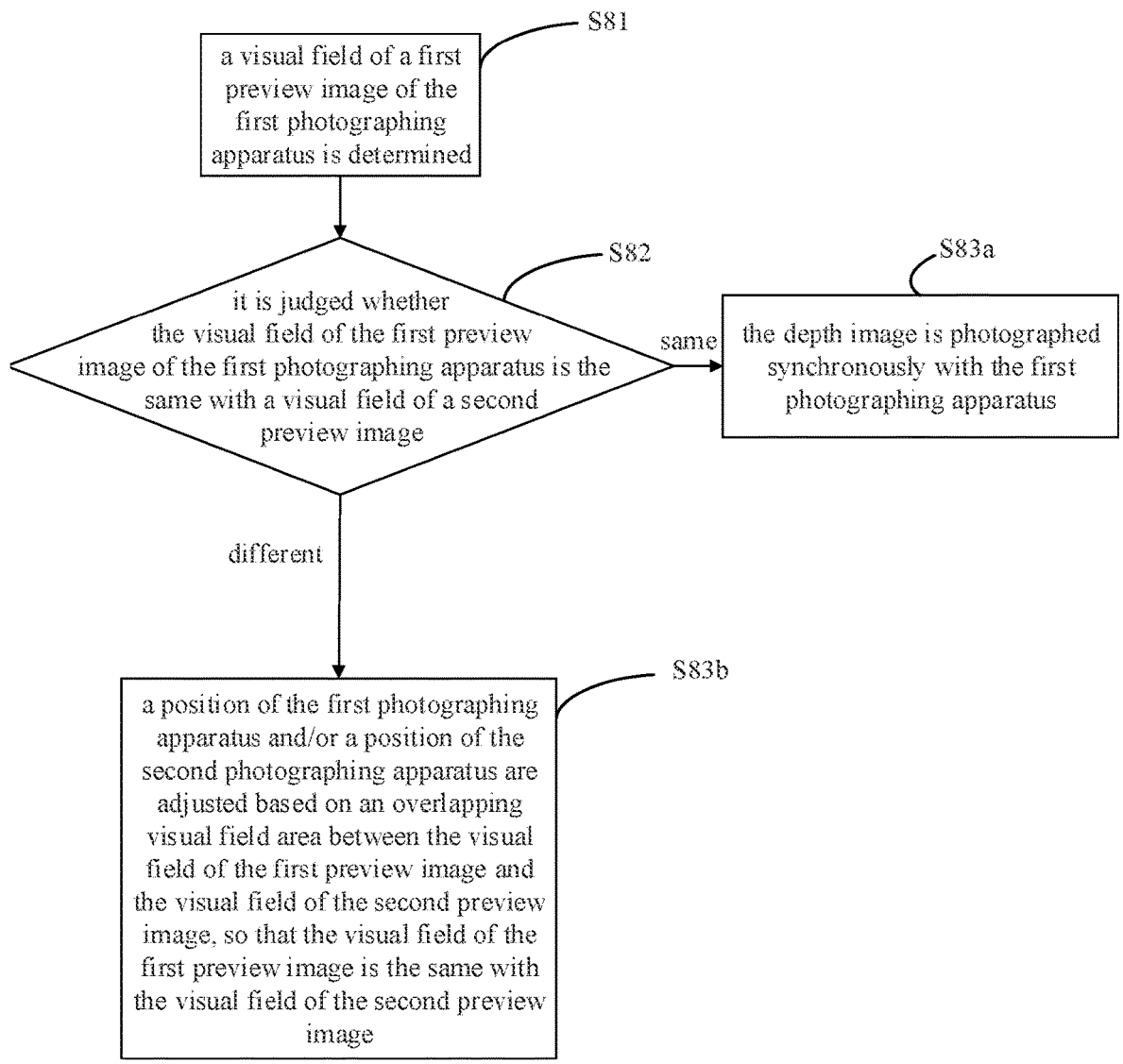
FIG. 22 is a flow chart of a photographing method according to an embodiment of the present disclosure.

FIG. 22 is a flow chart of a photographing method according to an embodiment. As shown in FIG. 22, the method includes the following steps.

At step S81, a visual field of a first preview image of the first photographing apparatus is determined.

At step S82, it is judged whether the visual field of the first preview image of the first photographing apparatus is the same with a visual field of a second preview image of the one or more second photographing apparatuses.

At step S83a, the depth image is photographed synchronously with the first photographing apparatus when the visual field of the first preview image of the first photographing apparatus is the same with the visual field of the second preview image.

At step S83b, when the visual field of the first preview image of the first photographing apparatus is different from the visual field of the second preview image, a position of the first photographing apparatus and/or a position of the one or more second photographing apparatuses are adjusted based on an overlapping visual field area between the visual field of the first preview image and the visual field of the second preview image, so that the visual field of the first preview image is the same with the visual field of the second preview image.

In the embodiments of the present disclosure, the visual field of the first preview image of the first photographing apparatus is determined, and when it is determined that the visual field of the first preview image of the first photographing apparatus is the same with the visual field of the second preview image, images with different view angles are photographed synchronously with the first photographing apparatus. That is, the visual field of the first preview image of the first photographing apparatus and the visual field of the second preview image of the second photographing apparatus are adjusted and kept the same, so as to photograph the images with the same visual field, which facilitates the depth image processing of the plurality of images.

In the embodiments of the present disclosure, if the visual field of the first preview image of the first photographing apparatus is different from the visual field of the second preview image, the position of the first photographing apparatus and/or the position of the second photographing apparatus are adjusted based on the overlapping visual field area between the visual field of the first preview image and the visual field of the second preview image, so that the visual field of the first preview image is the same with the visual field of the second preview image.

Further, the method of adjusting the position of the first photographing apparatus and/or the position of the second photographing apparatus based on the overlapping visual field area is the same with that shown in FIG. 19, and will not be repeated here.

Figure 23:
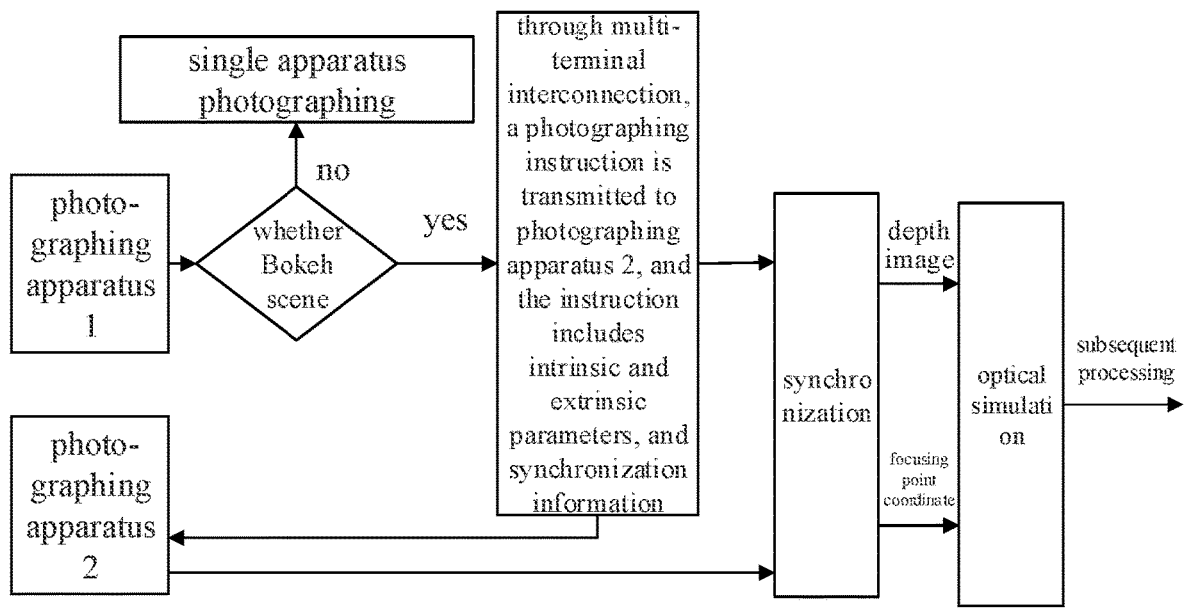
FIG. 23 is a flow chart of a photographing method according to an embodiment of the present disclosure.

FIG. 23 is a flow chart of an image processing method according to an embodiment. As shown in FIG. 23, after photographing apparatus 1 selects the bokeh scene, it can continue to choose whether to perform the single-photographing-apparatus bokeh or the multi-photographing-apparatus bokeh. If the mode of the multi-photographing-apparatus bokeh is selected, the process of the multi-photographing-apparatus bokeh is executed; otherwise, the normal photographing process of the single-photographing-apparatus bokeh is executed. Photographing apparatus 1 transmits a control instruction of bokeh photographing to photographing apparatus 2 through a multi-terminal interconnection channel, and the photographing instruction includes intrinsic parameters (the focal length, image center, distortion parameters and the like of the camera) and extrinsic parameters (the rotation and translation information of two mobile phone cameras) of photographing apparatus 1 and photographing apparatus 2. After receiving the instruction, photographing apparatus 2 returns the synchronization information to synchronize the information with photographing apparatus 1. After synchronization, two photographing apparatuses photograph the scene at the same time. Photographing apparatus 2 transmits the photographed image to photographing apparatus 1 through the multi-terminal interconnection channel. After receiving the focusing point coordinate fed back by photographing apparatus 2, photographing apparatus 1 carries out the optical simulation in combination with the depth image acquired by itself, and the optical simulation includes depth of field, radius of circle of confusion, spot reconstruction and noise matching, etc. Photographing apparatus 1 continues to perform other subsequent processing to complete the post-bokeh photographing process.

In the embodiments of the present disclosure, the first photographing apparatus transmits the depth information detection instruction to the one or more second photographing apparatuses, the instruction includes the intrinsic and extrinsic parameters the photographing apparatuses after calibration, and based on the synchronization information fed back by the second photographing apparatus, the first photographing apparatus controls the one or more second photographing apparatuses to synchronously photograph the depth images; and the depth image processing is carried out based on the plurality of depth images photographed synchronously. According to the present disclosure, the high-precision and high-resolution depth image information can be realized in the scenes of ranging, three-dimensional reconstruction, image bokeh and the like.

In the embodiments in which the plurality of photographing apparatuses are used to photograph an HDR image, the multi-terminal interconnection photographing instruction includes a high dynamic range (HDR) image generation instruction, and the high dynamic range image generation instruction is used to control the second photographing apparatus to photograph a plurality of frames of images synchronously.

Figure 24:
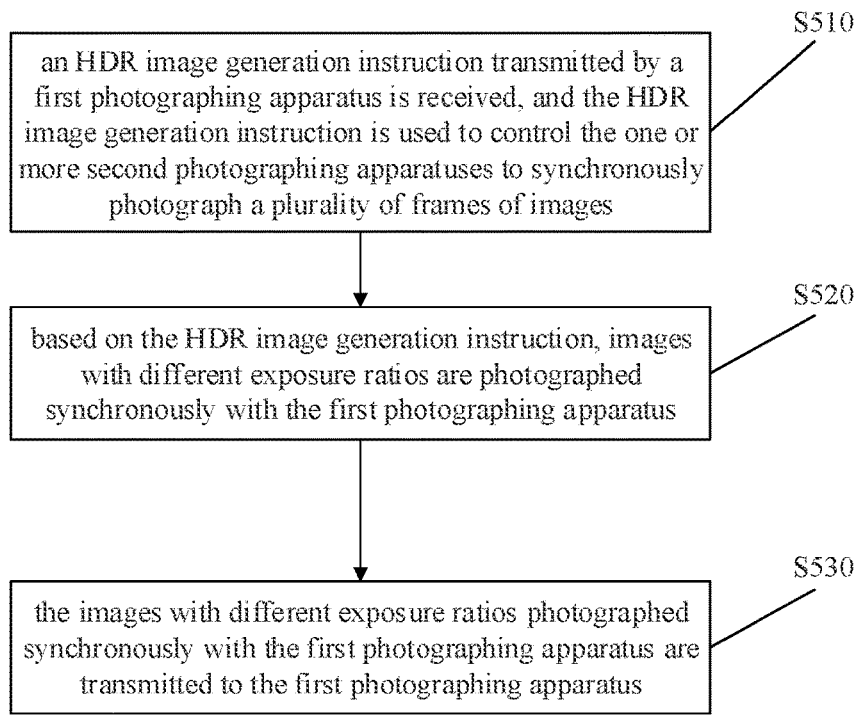
FIG. 24 is a flow chart of a photographing method according to an embodiment of the present disclosure.

FIG. 24 is a flow chart of a photographing method according to an embodiment. As shown in FIG. 24, the method is used for the one or more second photographing apparatuses and includes the following steps.

At step S510, an HDR image generation instruction transmitted by a first photographing apparatus is received, and the HDR image generation instruction is used to control the one or more second photographing apparatuses to synchronously photograph a plurality of frames of images.

At step S520, based on the HDR image generation instruction, images with different exposure ratios are photographed synchronously with the first photographing apparatus.

At step S530, the images with different exposure ratios photographed synchronously with the first photographing apparatus are transmitted to the first photographing apparatus.

In the embodiments of the present disclosure, the second photographing apparatus is connected with the first photographing apparatus through Bluetooth, wireless local area network or NFC to realize information communication, the second photographing apparatus receives the HDR image generation instruction transmitted by the first photographing apparatus, and the HDR image generation instruction is used to control the second photographing apparatus to synchronously photograph the plurality of frames of images. Based on the HDR image generation instruction, the second photographing apparatus photographs the images with different exposure ratios synchronously with the first photographing apparatus, and transmits the images with different exposure ratios photographed synchronously with the first photographing apparatus to the first photographing apparatus after the photographing is completed.

Figure 25:
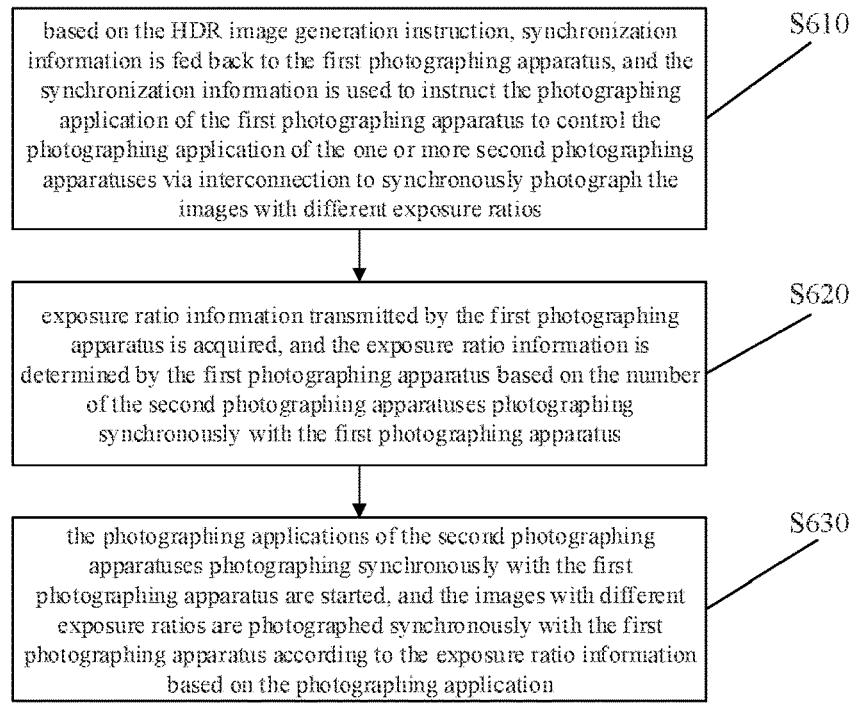
FIG. 25 is a flow chart of a photographing method according to an embodiment of the present disclosure.

FIG. 25 is a flow chart of a photographing method according to an embodiment. As shown in FIG. 25, the method includes the following steps.

At step S610, based on the HDR image generation instruction, synchronization information is fed back to the first photographing apparatus, and the synchronization information is used to instruct the photographing application of the first photographing apparatus to control the photographing application of the one or more second photographing apparatuses via interconnection to synchronously photograph the images with different exposure ratios.

At step S620, exposure ratio information transmitted by the first photographing apparatus is acquired, and the exposure ratio information is determined by the first photographing apparatus based on the number of the second photographing apparatuses photographing synchronously with the first photographing apparatus.

At step S630, the photographing applications of the second photographing apparatuses photographing synchronously with the first photographing apparatus are started, and the images with different exposure ratios are photographed synchronously with the first photographing apparatus according to the exposure ratio information based on the photographing application.

In the embodiments of the present disclosure, the first photographing apparatus and the second photographing apparatus are connected through Bluetooth, wireless local area network or NFC to realize information communication, and the second photographing apparatus feeds back the synchronization information to the first photographing apparatus based on the HDR image generation instruction, and the synchronization information is used to instruct the photographing application of the first photographing apparatus to control the photographing application of the one or more second photographing apparatuses to synchronously photograph the images with different exposure ratios. The second photographing apparatus acquires the exposure ratio information transmitted by the first photographing apparatus, and the exposure ratio information is determined by the first photographing apparatus based on the number of the second photographing apparatuses that photograph synchronously. The photographing application of the second photographing apparatus is started, and the images with different exposure ratios are photographed synchronously with the first photographing apparatus according to the exposure ratio information based on the photographing application.

The first photographing apparatus can set, modify and optimize the different exposure ratio information of itself and the second photographing apparatus according to the preset algorithm, machine learning and image integration effect.

The photographing application of the second photographing apparatus may be a application that is the same with the photographing application of the first photographing apparatus or a different application.

In the embodiments of the present disclosure, before the first photographing apparatus and the second photographing apparatus synchronously photograph images, it is necessary to adjust the photographing visual fields of the first photographing apparatus and the second photographing apparatus to be the same.

Figure 26:
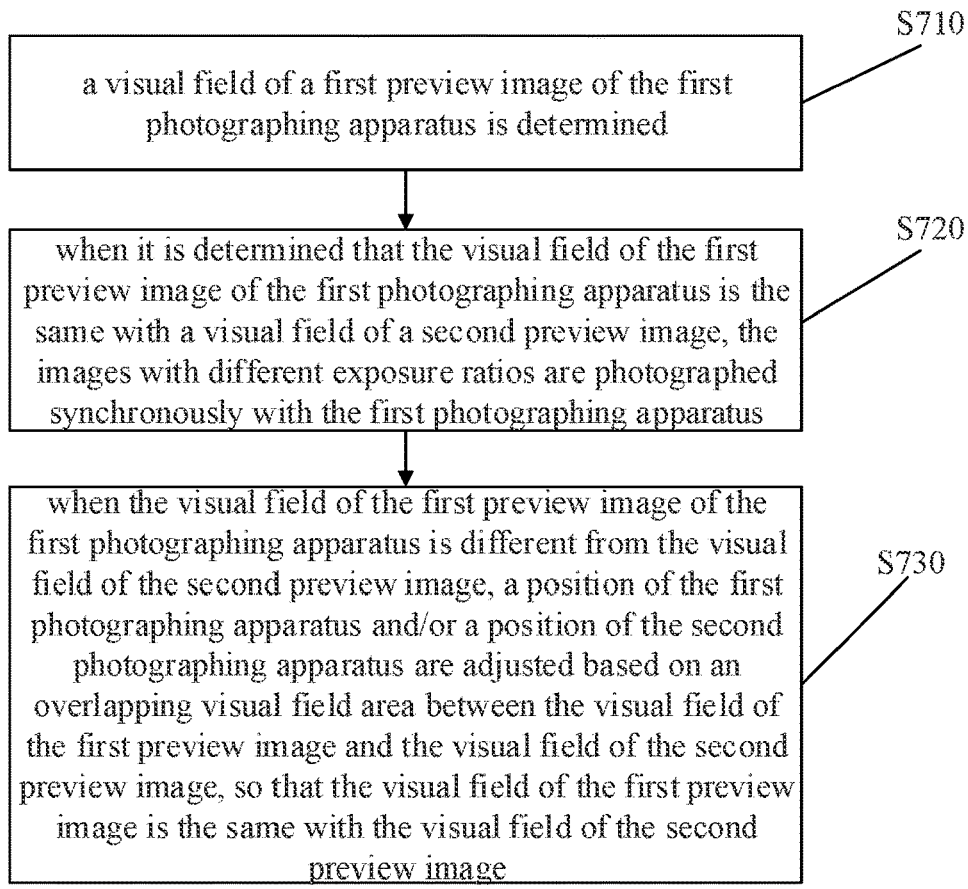
FIG. 26 is a flow chart of a method of adjusting a photographing visual field according to an embodiment of the present disclosure.

FIG. 26 is a flow chart of a method for adjusting a photographing visual field according to an embodiment. As shown in FIG. 26, the method includes the following steps.

At step S710, a visual field of a first preview image of the first photographing apparatus is determined.

At step S720, when it is determined that the visual field of the first preview image of the first photographing apparatus is the same with a visual field of a second preview image of the one or more second photographing apparatuses, the images with different exposure ratios are photographed synchronously with the first photographing apparatus.

At step S730, when the visual field of the first preview image of the first photographing apparatus is different from the visual field of the second preview image, a position of the first photographing apparatus and/or a position of the one or more second photographing apparatuses are adjusted based on an overlapping visual field area between the visual field of the first preview image and the visual field of the second preview image, so that the visual field of the first preview image is the same with the visual field of the second preview image.

In the embodiments of the present disclosure, the visual field of the first preview image of the first photographing apparatus is determined, and when it is determined that the visual field of the first preview image of the first photographing apparatus is the same with the visual field of the second preview image, the images with different exposure ratios are photographed synchronously with the first photographing apparatus. That is, the visual field of the first preview image of the first photographing apparatus and the visual field of the second preview image of the second photographing apparatus are adjusted and kept the same, so as to photograph the images with the same visual field, which facilitates the plurality of images to be integrated into the HDR image.

In the embodiments of the present disclosure, when the visual field of the first preview image of the first photographing apparatus is different from the visual field of the second preview image, the position of the first photographing apparatus and/or the position of the second photographing apparatus are adjusted based on the overlapping visual field area between the visual field of the first preview image and the visual field of the second preview image, so that the visual field of the first preview image is the same with the visual field of the second preview image.

Further, the method of adjusting the position of the first photographing apparatus and/or the position of the second photographing apparatus based on the overlapping visual field area is the same with that shown in FIG. 19, and will not be repeated here.

Figure 27:
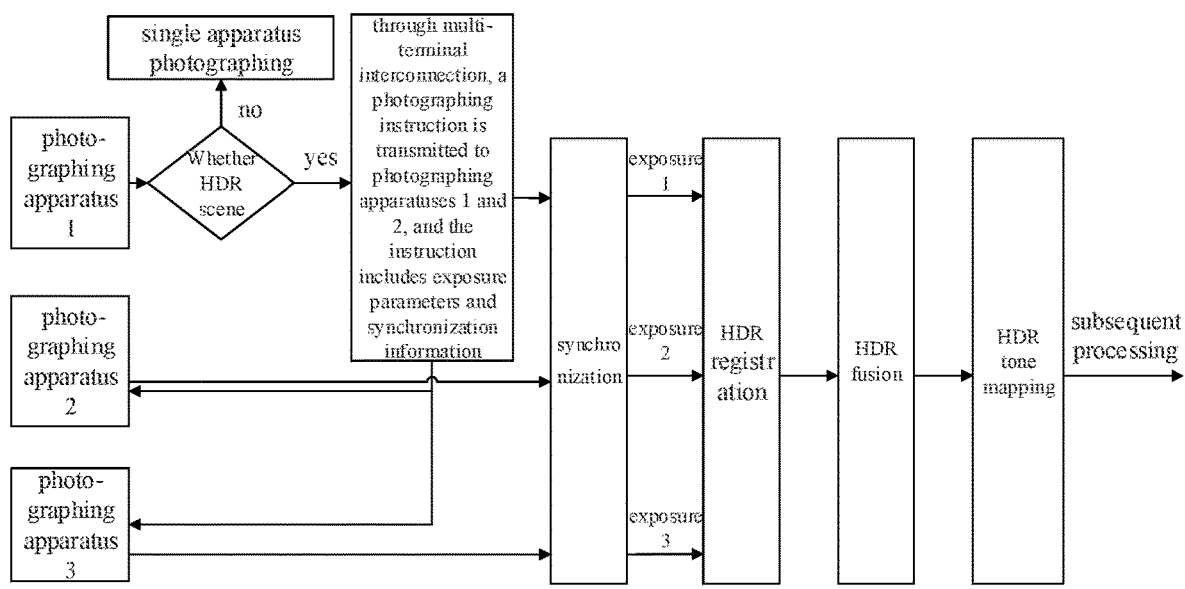
FIG. 27 is a flow chart of a photographing method according to an embodiment of the present disclosure.

FIG. 27 is a flow chart of a method for generating an HDR image according to an embodiment. As shown in FIG. 27, photographing apparatus 1 judges whether the current photographing scene is an HDR scene, and if so, a multi-terminal HDR photographing process is executed; if not, the normal process of a single-terminal photographing is executed. Photographing apparatus 1 transmits a control instruction of HDR photographing to photographing apparatus 2/photographing apparatus 3 through a multi-terminal interconnection channel, and the photographing instruction includes exposure information and synchronization information. After receiving the instruction, photographing apparatus 2/3 feeds back the synchronization information and synchronizes the information with photographing apparatus 1. After the information synchronization is completed, the three photographing apparatuses start to photograph with different exposure ratios at the same time. After the three photographing apparatuses have finished photographing, photographing apparatus 2/3 transmits the images with different exposure ratios to photographing apparatus 1 through the multi-terminal interconnection channel. Limited by the image processing capability and computing capability of the hardware of photographing apparatus 1, photographing apparatus 1 can upload the images to the server or its own image processing software for the registration, HDR fusion, Tone Mapping and other steps of three images with different exposures. Photographing apparatus 1 or the server continues to perform other subsequent processing to complete the HDR photographing process. The image registration is the process of matching and superimposing two or more images acquired at different times, via different sensors (imaging apparatuses) or under different conditions (weather, illumination, photographing position and angle, etc.). The tone mapping refers to compressing the dynamic range of the HDR image so that it can be displayed on an ordinary display without losing the shading details as much as possible. The HDR fusion means that the input images are acquired by different image sensors or by the same sensor at different times. After a plurality of input images are obtained, they are extracted, analyzed and comprehensively processed, so as to acquire an accurate and comprehensive description and reflection of a certain desired object.

In the method for generating the HDR image according to the embodiments of the present disclosure, the plurality of photographing apparatuses are multi-terminal interconnected and adjusted to photograph with the same photographing visual field, so as to realize the simultaneous photographing of a plurality of frames of images with different exposure ratios. The first photographing apparatus controls the second photographing apparatus to photograph the images with different exposure ratios at the same time, and the plurality of images photographed are integrated, so that the ghost image problem of HDR can be effectively solved while realizing HDR.

Based on the same concept, the embodiments of the present disclosure also provide a photographing apparatus.

It can be understood that in order to realize the above functions, the photographing apparatus provided by the embodiments of the present disclosure includes corresponding hardware structures and/or software modules for performing various functions. Combining the units and algorithm steps of various examples disclosed in the embodiments of the present disclosure, the embodiments of the present disclosure can be realized in the form of hardware or a combination of hardware and computer software. Whether a function is executed by hardware or in the form of computer software driving hardware depends on the specific application and design constraints of the technical solution. Those skilled in the art can use different methods to realize the described functions for each specific application, but this realization should not be considered beyond the scope of the technical solution in the embodiments of the present disclosure.

Figure 28:
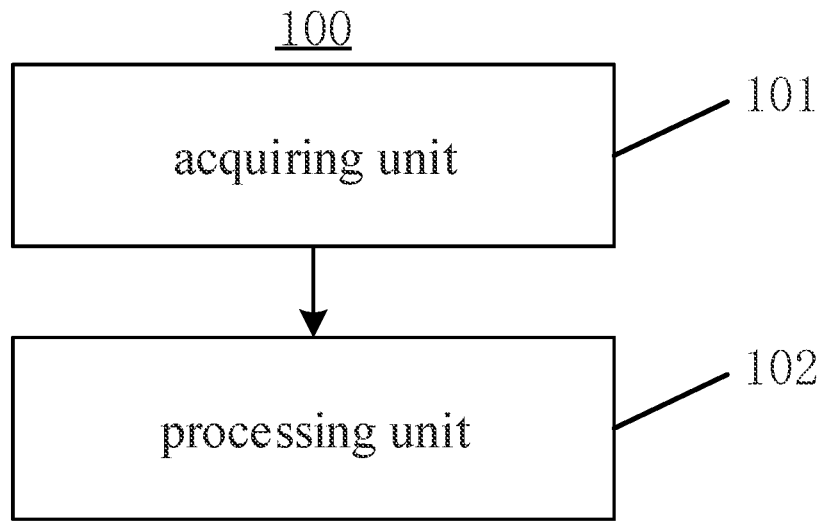
FIG. 28 is a block diagram of a photographing apparatus applied to a first photographing apparatus according to an embodiment of the present disclosure.

FIG. 28 is a block diagram of a photographing device 100 applied to a first photographing apparatus according to an embodiment. Referring to FIG. 28, the device includes an acquiring unit 101 and a processing unit 102.

The acquiring unit 101 is configured to acquire images from one or more second photographing apparatuses respectively to obtain a plurality of frames of images, in response to determining that a processing condition for multi-frame photographing is met.

The processing unit 102 is configured to perform multi-frame fusion processing on the plurality of frames of images to obtain a photographed image.

In an embodiment, the acquiring unit 101 acquires the images from the one or more second photographing apparatuses to obtain the plurality of frames of images in the following manner: transmitting a multi-terminal interconnection photographing instruction to the one or more second photographing apparatuses, in which the multi-terminal interconnection photographing instruction is used for requesting the second photographing apparatus to photograph the image for the multi-frame fusion processing; if a multi-terminal interconnection photographing confirmation message transmitted by the one or more second photo apparatuses is received, starting a photographing application of the first photo apparatus, and acquiring a first preview image photographed by the photographing application of the first photo apparatus and a second preview image photographed by a photographing application of the one or more second photo apparatuses; based on visual fields of the first preview image and the second preview image, controlling the one or more second photographing apparatuses via interconnection to photograph synchronously; acquiring images synchronously photographed by the first photographing apparatus and the one or more second photographing apparatuses to obtain the plurality of frames of images.

In an embodiment, the acquiring unit 101 controls the one or more second photographing apparatuses via interconnection to photograph synchronously based on the visual fields of the first preview image and the second preview image in the following manner: determining an overlapping visual field area between the visual field of the first preview image and the visual field of the second preview image; adjusting a position of the first photographing apparatus and/or a position of the second photographing apparatus based on the overlapping visual field area, so that a visual field of the first preview image is the same with a visual field of the second preview image; when it is determined that the visual field of the first preview image is the same with the visual field of the second preview image, controlling the one or more second photographing apparatuses via interconnection to synchronously photograph.

In an embodiment, the acquiring unit 101 adjusts the position of the first photographing apparatus and/or the position of the second photographing apparatus based on the overlapping visual field area in the following manner: if the overlapping visual field area is different from the visual field of the first preview image and the visual field of the second preview image, displaying a first prompt message for prompting to adjust the position of the first photographing apparatus and/or the position of the second photographing apparatus, so that the visual field of the first preview image and the visual field of the second preview image are the same with the overlapping visual field area; in response to determining that the visual field of the first preview image and the visual field of the second preview image are the same with the overlapping visual field area, displaying a second prompt message for prompting that the visual field of the first preview image and the visual field of the second preview image are the same with the overlapping visual field area.

In an embodiment, the acquiring unit 101 determines the overlapping visual field area between the first preview image and the second preview image in the following manner: matching feature points against each other based on the first preview image and the second preview image; taking an area where feature points in the first preview image and the second preview image match as the overlapping visual field area between the first preview image and the second preview image.

Figure 29:
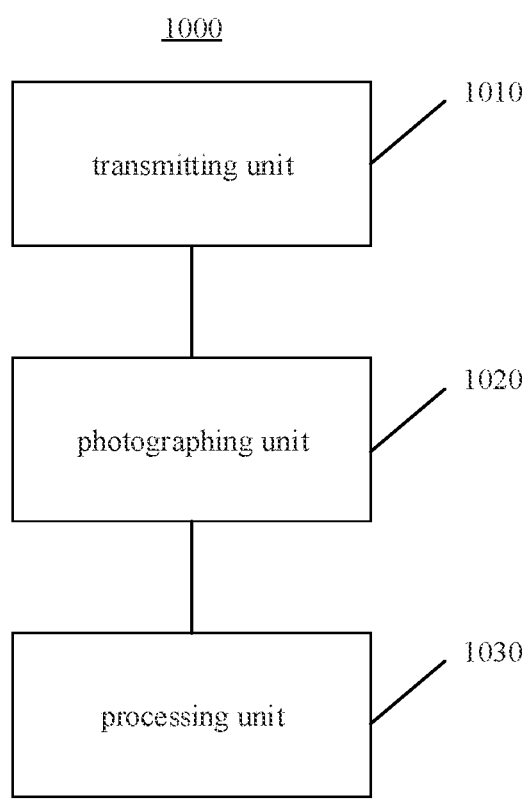
FIG. 29 is a block diagram of a photographing apparatus applied to a first photographing apparatus according to an embodiment of the present disclosure.

FIG. 29 is a block diagram of a photographing device 1000 for a first photographing apparatus according to an embodiment for depth image processing of the present disclosure. Referring to FIG. 29, the device 1000 includes a transmitting unit 1010, a photographing unit 1020 and a processing unit 1030.

The transmitting unit 1010 is configured to determine that the first photographing apparatus is triggered to detect depth information based on a plurality of photographing apparatuses, and transmit a depth information detection instruction to one or more second photographing apparatuses, in which the depth information detection instruction is used to control the one or more second photographing apparatuses to synchronously photograph a plurality of frames of depth images, and the plurality of photographing apparatuses include the first photographing apparatus and the one or more second camera photographing apparatuses.

The photographing unit 1020 is configured to photograph a depth image synchronously with the one or more second photographing apparatuses based on the depth information detection instruction.

The processing unit 1030 is configured to perform image processing based on the depth images synchronously photographed by the first photographing apparatus and the one or more second photographing apparatuses.

The photographing unit 1020 photographs the depth image synchronously with the one or more second photographing apparatuses based on the depth information detection instruction in the following manner: receiving synchronization information fed back by the one or more second photographing apparatuses based on the depth information detection instruction; based on the synchronization information, controlling a photographing application of the one or more second photographing apparatuses through a photographing application of the first photographing apparatus via interconnection to synchronously photograph the depth image.

The photographing unit 1020 receives the synchronization information fed back by the one or more second photographing apparatuses based on the depth information detection instruction in the following manner: receiving intrinsic parameters of the one or more second photographing apparatuses transmitted by the one or more second photographing apparatuses based on the depth information detection instruction; determining extrinsic parameters between the first photographing apparatus and the one or more second photographing apparatuses based on intrinsic parameters of the first photographing apparatus and the intrinsic parameters of the one or more second photographing apparatuses, and performing a camera calibration on the first photographing apparatus; transmitting the extrinsic parameters between the first photographing apparatus and the one or more second photographing apparatuses to the one or more second photographing apparatuses respectively; receiving the synchronization information fed back by the one or more second photographing apparatuses after calibration based on the extrinsic parameters between the first photographing apparatus and the one or more second photographing apparatuses.

The synchronization information includes a visual field of a second preview image photographed by a photographing application of the one or more second photographing apparatuses.

The photographing unit 1020 controls the photographing application of the one or more second photographing apparatuses through the photographing application of the first photographing apparatus via interconnection to synchronously photograph the depth image based on the synchronization information in the following manner: acquiring a first preview image photographed by the photographing application of the first photographing apparatus, and determining a visual field of the first preview image; acquiring a visual field of a second preview image photographed by the photographing application of the one or more second photographing apparatuses; based on the visual field of the first preview image and the visual field of the second preview image, controlling the one or more second photographing apparatuses through the first photographing apparatus via interconnection to photograph synchronously.

Based on the visual field of the first preview image and the visual field of the second preview image, the photographing unit 1020 controls the one or more second photographing apparatuses through the first photographing apparatus via interconnection to photograph synchronously in a same manner as the acquiring unit 101 in FIG. 28, which will not be repeated here.

Figure 30:
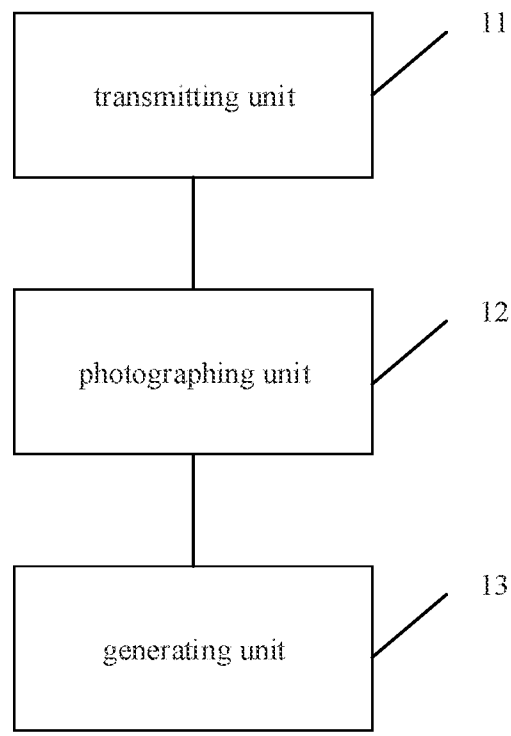
FIG. 30 is a block diagram of a photographing apparatus applied to a first photographing apparatus according to an embodiment of the present disclosure.

FIG. 30 is a block diagram of a photographing device 10 for a first photographing apparatus according to an embodiment for generating an HDR image of the present disclosure. Referring to FIG. 30, the device 10 includes a transmitting unit 11, a photographing unit 12 and a generating unit 13.

The transmitting unit 11 is configured to transmit an HDR image generation instruction to one or more second photographing apparatuses, in response to determining to generate an HDR image based on image frames acquired by a plurality of photographing apparatuses, in which the HDR image generation instruction is used for controlling the second photographing apparatus to synchronously photograph a plurality of frames of images.

The photographing unit 12 is configured to photograph images with different exposure ratios synchronously with the one or more second photographing apparatuses based on the HDR image generation instructions.

The generating unit 13 is configured to generate an HDR image based on the images with different exposure ratios synchronously photographed by the first photographing apparatus and the one or more second photographing apparatuses.

The photographing unit 12 photographs the images with different exposure ratios synchronously with the one or more second photographing apparatuses based on the HDR image generation instruction in the following manner: receiving synchronization information fed back by the one or more second photographing apparatuses based on the HDR image generation instruction; based on the synchronization information, determining the second photographing apparatuses photographing synchronously with the first photographing apparatus and the number of the second photographing apparatuses photographing synchronously with the first photographing apparatus; based on the number, determining different exposure ratio information required for generating the HDR image; transmitting the different exposure ratio information to the second photographing apparatus photographing synchronously with the first photographing apparatus respectively, in which different second photographing apparatuses correspond to different exposure ratio information; starting the photographing applications of the first photographing apparatus and the second photographing apparatus, and synchronously photographing the images with different exposure ratios according to the respective exposure ratio information corresponding to the second photographing apparatuses based on the photographing applications.

The synchronization information includes a visual field of a second preview image photographed by the photographing application of the one or more second photographing apparatuses.

The photographing unit 12 determines the second photographing apparatus photographing synchronously with the first photographing apparatus based on the synchronization information in the following manner: acquiring a first preview image photographed by the photographing application of the first photographing apparatus, and determining a visual field of the first preview image; acquiring a visual field of a second preview image photographed by the photographing application of the one or more second photographing apparatuses; determining the second photographing apparatus corresponding to the second preview image having the same visual field as the first preview image as the second photographing apparatus photographing synchronously with the first photographing apparatus.

The photographing unit 12 is also configured to determine an overlapping visual field area between the visual field of the first preview image and the visual field of the second preview image before determining the second photographing apparatus corresponding to the second preview image having the same visual field as the first preview image.

Based on the overlapping visual field area, a position of the first photographing apparatus and/or a position of the second photographing apparatus are adjusted so that the visual field of the first preview image is the same with the visual field of the second preview image.

The way in which the photographing unit 12 adjusts the position of the first photographing apparatus and/or the position of the second photographing apparatus based on the overlapping visual field area is the same with that of the acquiring unit 101 in FIG. 28, and will not be repeated here.

Figure 31:
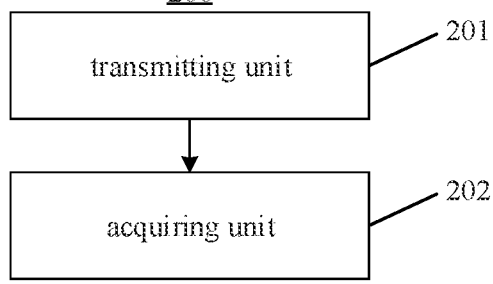
FIG. 31 is a block diagram of a photographing apparatus applied to a second photographing apparatus according to an embodiment of the present disclosure.

FIG. 31 is a block diagram of a photographing device 200 applied to one or more second photographing apparatuses according to an embodiment. Referring to FIG. 31, the device includes a transmitting unit 201 and an acquiring unit 202.

The transmitting unit 201 is configured to transmit an image to a first photographing apparatus in response to determining that a processing condition for multi-frame photographing is met.

The acquiring unit 202 is configured to acquire a photographed image transmitted by the first photographing apparatus after performing multi-frame fusion processing based on the images transmitted by the one or more second photographing apparatuses.

In an embodiment, the transmitting unit 201 transmits the image to the first photographing apparatus in the following manner: in response to acquiring a multi-terminal interconnection photographing instruction transmitted by the first photographing apparatus, transmitting a multi-terminal interconnection photographing confirmation message to the first photographing apparatus, in which the multi-terminal interconnection photographing instruction is used for requesting the second photographing apparatus to photograph the image for the multi-frame fusion processing; starting a photographing application of the one or more second photographing apparatuses, acquiring images photographed by the one or more second photographing apparatuses synchronously with the first photographing apparatus, and transmitting the images photographed by the one or more second photographing apparatuses synchronously with the first photographing apparatus to the first photographing apparatus.

In an embodiment, the transmitting unit 201 starts the photographing application of the one or more second photographing apparatuses and acquires the images photographed by the one or more second photographing apparatuses synchronously with the first photographing apparatus in the following manner: starting the photographing application of the one or more second photographing apparatuses, and acquiring a second preview image photographed by the photographing application of the one or more second photographing apparatuses; adjusting a position of the first photographing apparatus and/or a position of the second photographing apparatus in response to that the first photographing apparatus determines an overlapping visual field area between a first preview image photographed by the photographing application of the first photographing apparatus and the second preview image, so that a visual field of the first preview image is the same with a visual field of the second preview image; acquiring the images photographed by the one or more second photographing apparatuses synchronous with the first photographing device, when it is determined that the visual field of the first preview image is the same with the visual field of the second preview image.

In an embodiment, the transmitting unit 201 adjusts the position of the first photographing apparatus and/or the position of the second photographing apparatus in response to that the first photographing apparatus determines the overlapping visual field area between the first preview image photographed by the photographing application of the first photographing apparatus and the second preview image, in the following manner: in response to that the overlapping visual field area is different from the visual field of the first preview image and the visual field of the second preview image, displaying a first prompt message for prompting to adjust the position of the first photographing apparatus and/or the position of the second photographing apparatus, so that the visual field of the first preview image and the visual field of the second preview image are the same with the overlapping visual field area; in response to that the overlapping visual field area is the same with the visual field of the first preview image and the visual field of the second preview image, displaying a second prompt message for prompting that the visual field of the first preview image and the visual field of the second preview image are the same with the overlapping visual field area.

Figure 32:
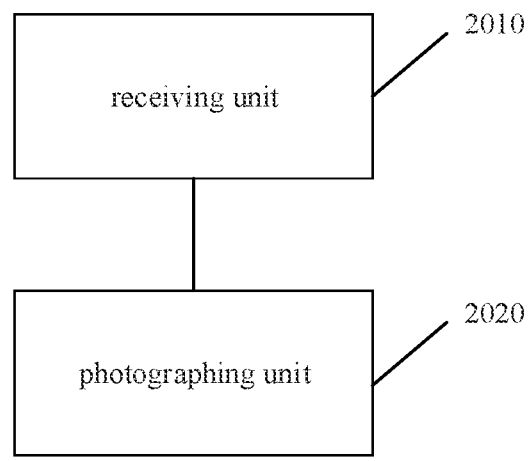
FIG. 32 is a block diagram of a photographing apparatus applied to a second photographing apparatus according to an embodiment of the present disclosure.

FIG. 32 is a block diagram of a photographing device 2000 applied to a second photographing apparatus according to an embodiment for depth image processing of the present disclosure. Referring to FIG. 32, the device 2000 includes a receiving unit 2010 and a photographing unit 2020.

The receiving unit 2010 is configured to receive a depth information detection instruction transmitted by a first photographing apparatus, and the depth information detection instruction is used to control the second photographing apparatus to synchronously photograph a plurality of frames of depth images.

The photographing unit 2020 is configured to photograph the depth image synchronously with the first photographing apparatus based on the depth information detection instruction.

The photographing unit 2020 photographs the depth image synchronously with the first photographing apparatus based on the depth information detection instruction in the following manner: based on the depth information detection instruction, feeding back synchronization information to the first photographing apparatus, and the synchronization information is used to instruct a photographing application of the first photographing apparatus to control a photographing application of one or more second photographing apparatuses via interconnection to synchronously photograph the depth image.

The photographing unit 2020 feeds back the synchronization information to the first photographing apparatus based on the depth information detection instruction in the following manner: based on the depth information detection instruction, transmitting intrinsic parameters of the one or more second photographing apparatuses to the first photographing apparatus; performing a camera calibration on the second photographing apparatus, when receiving extrinsic parameters between the first photographing apparatus and the one or more second photographing apparatuses transmitted by the first photographing apparatus based on the intrinsic parameters of the one or more second photographing apparatuses; transmitting the synchronization information to the first photographing apparatus after determining that the camera calibration of the second photographing apparatus is completed.

The synchronization information includes a visual field of a second preview image photographed by a photographing application of the one or more second photographing apparatuses. When a visual field of a first preview image of the first photographing apparatus is the same with the visual field of the second preview image, the photographing unit 2020 photographs the depth image synchronously with the first photographing apparatus.

When the visual field of the first preview image of the first photographing apparatus is different from the visual field of the second preview image, the photographing unit 2020 adjusts a position of the first photographing apparatus and/or a position of the second photographing apparatus based on an overlapping visual field area between the visual field of the first preview image and the visual field of the second preview image, so that the visual field of the first preview image is the same with the visual field of the second preview image.

The way in which the photographing unit 2020 adjusts the position of the first photographing apparatus and/or the position of the second photographing apparatus based on the overlapping visual field area is the same with that of the transmitting unit 201 in FIG. 31, and will not be repeated here.

Figure 33:
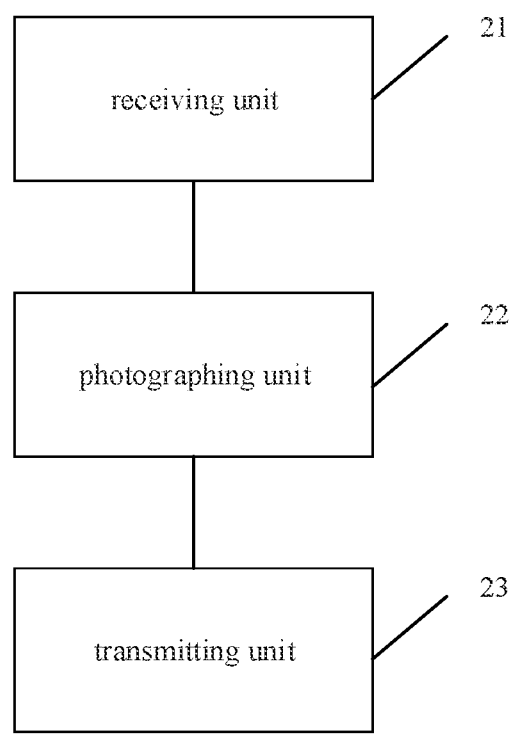
FIG. 33 is a block diagram of a photographing apparatus applied to a second photographing apparatus according to an embodiment of the present disclosure.

FIG. 33 is a block diagram of a photographing device 20 applied to a second photographing apparatus according to an embodiment for generating an HDR image of the present disclosure. Referring to FIG. 33, the device 20 includes a receiving unit 21, a photographing unit 22, a transmitting unit 23 and a determining unit 24.

The receiving unit 21 is configured to receive an HDR image generation instruction transmitted by a first photographing apparatus, and the HDR image generation instruction is used to control the second photographing apparatus to synchronously photograph a plurality of frames of images.

The photographing unit 22 is configured to photograph images with different exposure ratios synchronously with the first photographing apparatus based on the HDR image generation instruction.

The transmitting unit 23 is configured to transmit the images with different exposure ratios photographed synchronously with the first photographing apparatus to the first photographing apparatus.

In an embodiment, the photographing unit 22 photographs the images with different exposure ratios synchronously with the first photographing apparatus based on the HDR image generation instruction in the following manner: feeding back synchronization information to the first photographing apparatus based on the HDR image generation instruction, in which the synchronization information is used for instructing a photographing application of the first photographing apparatus to control a photographing application of the one or more second photographing apparatuses via interconnection to synchronously photograph the images with different exposure ratios; acquiring exposure ratio information transmitted by the first photographing apparatus, in which the exposure ratio information is determined by the first photographing apparatus based on the number of the second photographing apparatuses for synchronously photographing; starting the photographing application of the second photographing apparatus, and photographing the images with different exposure ratios synchronously with the first photographing apparatus according to the exposure ratio information based on the photographing application.

The synchronization information includes a visual field of a second preview image photographed by the photographing application of the second photographing apparatus.

The photographing unit 22 is also configured to: determine a visual field of a first preview image of the first photographing apparatus; photograph the images with different exposure ratios synchronously with the first photographing apparatus, when it is determined that the visual field of the first preview image of the first photographing apparatus is the same with the visual field of the second preview image; adjust the position of the first photographing apparatus and/or the position of the second photographing apparatus based on an overlapping visual field area between the visual field of the first preview image and the visual field of the second preview image, when it is determined that the visual field of the first preview image of the first photographing apparatus is different from the visual field of the second preview image, so that the visual field of the first preview image is the same with the visual field of the second preview image.

The way in which the photographing unit 22 adjusts the position of the first photographing apparatus and/or the position of the second photographing apparatus based on the overlapping visual field area is the same with that of the transmitting unit 201 in FIG. 31, and will not be repeated here.

With regard to the devices in the above embodiments, the specific way in which each module performs operations has been described in detail in the embodiments of the method, and will not be described in detail here.

Figure 34:
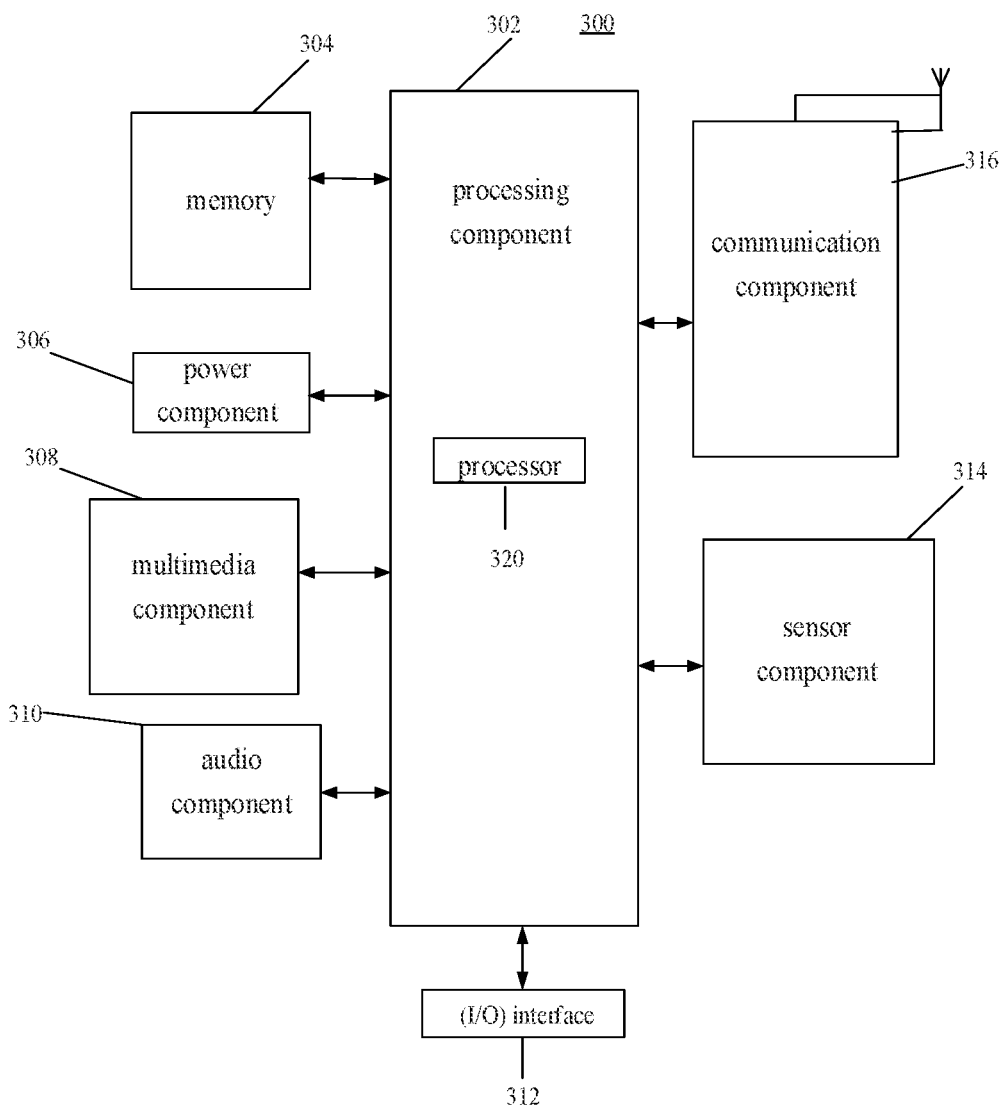
FIG. 34 is a block diagram of a photographing apparatus according to an embodiment of the present disclosure.

FIG. 34 is a block diagram of a device 300 for photographing according to an embodiment. For example, the device 300 may be a mobile phone, a computer, a digital broadcasting terminal, a messaging device, a game console, a tablet apparatus, a medical apparatus, a fitness apparatus, a personal digital assistant and the like.

Referring to FIG. 34, the device 300 may include one or more of the following components: a processing component 302, a memory 304, a power component 306, a multimedia component 308, an audio component 310, an input/output (I/O) interface 312, a sensor component 314, and a communication component 316.

The processing component 302 generally controls the overall operation of the device 300, such as operations associated with display, telephone call, data communication, camera operation and recording operation. The processing component 302 may include one or more processors 320 to execute instructions to complete all or part of the steps of the method described above. In addition, the processing component 302 can include one or more modules to facilitate the interaction between the processing component 302 and other components. For example, the processing component 302 can include a multimedia module to facilitate interaction between the multimedia component 308 and the processing component 302.

The memory 304 is configured to store various types of data to support operations in the device 300. Examples of these data include instructions for any application or method operating on the device 300, contact data, phone book data, messages, pictures, videos, and the like. The memory 304 can be realized by any type of volatile or nonvolatile memory device or their combination, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk.

The power component 306 provides power to various components of the device 300. The power component 306 may include a power management system, one or more power sources, and other components associated with generating, managing and distributing power for the device 300.

The multimedia component 308 includes a screen that provides an output interface between the device 300 and the user. In some embodiments, the screen may include a liquid crystal display (LCD) and a touch panel (TP). If the screen includes the touch panel, the screen may be implemented as a touch screen to receive an input signal from the user. The touch panel includes one or more touch sensors to sense touch, sliding and gestures on the touch panel. The touch sensor may not only sense the boundary of a touch or sliding action, but also detect the duration and pressure related to the touch or sliding operation. In some embodiments, the multimedia component 308 includes a front camera and/or a rear camera. When the device 300 is in an operation mode, such as a photographing mode or a video mode, the front camera and/or the rear camera can receive external multimedia data. Each front camera and rear camera may be a fixed optical lens system or have focal length and optical zoom capability.

The audio component 310 is configured to output and/or input audio signals. For example, the audio component 310 includes a microphone (MIC) configured to receive external audio signals when the device 300 is in an operation mode, such as a call mode, a recording mode and a voice recognition mode. The received audio signal may be further stored in the memory 304 or transmitted via the communication component 316. In some embodiments, the audio component 310 further includes a speaker for outputting audio signals.

The I/O interface 312 provides an interface between the processing component 302 and peripheral interface modules, which can be keyboards, clickwheels, buttons, etc. These buttons may include, but are not limited to, home button, volume button, start button and lock button.

The sensor component 314 includes one or more sensors for providing various aspects of state evaluations for the device 300. For example, the sensor component 314 can detect the on/off state of the device 300, the relative positioning of components, such as the display and keypad of the device 300, the position change of the device 300 or a component of the device 300, the presence or absence of user contact with the device 300, the orientation or acceleration/deceleration of the device 300 and the temperature change of the device 300. The sensor component 314 may include a proximity sensor configured to detect the presence of a nearby object without any physical contact. The sensor component 314 may also include an optical sensor, such as a CMOS or CCD image sensor, for use in imaging applications. In some embodiments, the sensor component 314 may further include an acceleration sensor, a gyro sensor, a magnetic sensor, a pressure sensor or a temperature sensor.

The communication component 316 is configured to facilitate wired or wireless communication between the device 300 and other apparatus. The device 300 can access a wireless network based on communication standards, such as WiFi, 2G, 3G, 4G, or 5G, or a combination thereof. In an embodiment, the communication component 316 receives a broadcast signal or broadcast related information from an external broadcast management system via a broadcast channel. In an embodiment, the communication component 316 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an embodiment, the device 300 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronic components for performing the above methods.

In the embodiments, there is also provided a non-transitory computer-readable storage medium including instructions, such as the memory 304 including instructions, which can be executed by the processor 320 of the apparatus 300 to complete the above method. For example, the non-transitory computer-readable storage medium can be ROM, random access memory (RAM), CD-ROM, magnetic tape, floppy disk, optical data storage device, etc.

It can be understood that "a plurality of" in the present disclosure refers to two or more, and other quantifiers are similar. The term "and/or", which describes the relationship of related objects, means that there may be three kinds of relationships, for example, A and/or B may mean that A exists alone, A and B exist together, and B exists alone. The character "/" generally indicates that the former and latter associated objects have an OR relationship. The singular forms "a", "said" and "the" are also intended to include the plural forms, unless the context clearly indicates other meaning.

It is further understood that the terms "first" and "second" are used to describe various information, but these information should not be limited to these terms. These terms are only used to distinguish the same type of information from each other and do not indicate a specific order or importance. In fact, the terms "first" and "second" can be used interchangeably. For example, without departing from the scope of the present disclosure, the first information may also be called the second information, and similarly, the second information may also be called the first information.

It can be further understood that the orientations or position relationships indicated by the terms "center", "front", "rear", "upper", "lower", "left", "right", and the like are only intended for the convenience of describing the embodiments, and do not indicate or imply that the device or element referred to must have a specific orientation, be constructed and operated in a specific orientation.

It can be further understood that unless otherwise specified, the term "connection" includes the direct connection without other members therebetween, and the indirect connection with other members therebetween.

It can be further understood that although the operations in the embodiments of the present disclosure are described in a specific order in the drawings, it should not be understood as requiring that these operations should be performed in the specific order or serial order shown, or that all the operations shown should be performed to acquire the desired results. In certain circumstances, multitasking and parallel processing may be beneficial.

Other embodiments of the present disclosure will easily occur to those skilled in the art after considering the specification and practicing the invention disclosed herein. The present disclosure is intended to cover any variations, usages or adaptations of the present disclosure, which follow the general principles of the present disclosure and include the common knowledge or conventional technical means in the art that are not disclosed in the present disclosure.

It should be understood that the present disclosure is not limited to the precise structure described above and shown in the drawings, and various modifications and changes can be made without departing from the scope of the present disclosure. The scope of the present disclosure is limited only by the scope of the appended claims.

What is claimed is:

1. A photographing method, applied to a first photographing apparatus, comprising:
in response to determining that a processing condition for multi-frame photographing is met, acquiring images from one or more second photographing apparatuses respectively to obtain a plurality of frames of images; and
performing multi-frame fusion processing on the plurality of frames of images to obtain a photographed image,
wherein acquiring the images from the one or more second photographing apparatuses respectively to obtain the plurality of frames of images comprises:
transmitting a multi-terminal interconnection photographing instruction to the one or more second photographing apparatuses, wherein the multi-terminal interconnection photographing instruction is configured for requesting the one or more second photographing apparatuses to photograph synchronously to obtain the plurality of frames of images,
wherein the multi-terminal interconnection photographing instruction comprises a depth information detection instruction, and the depth information detection instruction is configured to control the one or more second photographing apparatuses to photograph a plurality of frames of depth images; and
the photographing method comprises:
photographing a depth image synchronously with the one or more second photographing apparatuses; and
performing image processing based on the depth images synchronously photographed by the first photographing apparatus and the one or more second photographing apparatuses,
wherein photographing the depth image synchronously with the one or more second photographing apparatuses comprises:
receiving synchronization information fed back by the one or more second photographing apparatuses based on the depth information detection instruction; and
based on the synchronization information, controlling by a photographing application of the first photographing apparatus a photographing application of the one or more second photographing apparatuses via interconnection to photograph the depth image synchronously with the one or more second photograph apparatuses, wherein receiving the synchronization information fed back by the one or more second photographing apparatuses based on the depth information detection instruction comprises:
receiving intrinsic parameters of the one or more second photographing apparatuses respectively transmitted by the one or more second photographing apparatuses based on the depth information detection instruction;
determining extrinsic parameters between the first photographing apparatus and the one or more second photographing apparatuses based on intrinsic parameters of the first photographing apparatus and the intrinsic parameters of the one or more second photographing apparatuses, and performing a camera calibration on the first photographing apparatus;
transmitting the extrinsic parameters between the first photographing apparatus and the one or more second photographing apparatuses to the one or more second photographing apparatuses respectively; and
receiving the synchronization information fed back by the one or more second photographing apparatuses after calibration based on the extrinsic parameters between the first photographing apparatus and the one or more second photographing apparatuses.

2. The photographing method according to claim 1, wherein controlling by the photographing application of the first photographing apparatus the photographing application of the one or more second photographing apparatuses via interconnection to photograph the depth image synchronously with the one or more second photograph apparatuses, comprises:
acquiring a first preview image photographed by the photographing application of the first photographing apparatus and determining a visual field of the first preview image;
acquiring a visual field of a second preview image photographed by the photographing application of the one or more second photographing apparatuses, wherein the synchronization information comprises the visual field of the second preview image photographed by the photographing application of the one or more second photographing apparatuses; and
based on the visual field of the first preview image and the visual field of the second preview image, controlling by the first photographing apparatus the one or more second photographing apparatuses via interconnection to photograph synchronously.

3. The photographing method according to claim 2, wherein based on the visual field of the first preview image and the visual field of the second preview image, controlling by the first photographing apparatus the one or more second photographing apparatuses via interconnection to photograph synchronously, comprises:
determining an overlapping visual field area between the visual field of the first preview image and the visual field of the second preview image;
adjusting at least one of a position of the photographing apparatus or a position of the one or more second photographing apparatuses based on the overlapping visual field area, to allow the visual field of the first preview image to be the same with the visual field of the second preview image; and
controlling by the first photographing apparatus the one or more second photographing apparatuses to photograph synchronously, in response to determining that the visual field of the first preview image is the same with the visual field of the second preview image.

4. The photographing method according to claim 3, wherein adjusting at least one of the position of the photographing apparatus or the position of the one or more second photographing apparatuses based on the overlapping visual field area comprises:
- in response to determining that the overlapping visual field area is different from the visual field of the first preview image and the visual field of the second preview image, displaying a first prompt message for prompting to adjust the at least one of the position of the first photographing apparatus or the position of the one or more second photographing apparatuses, to allow the visual field of the first preview image and the visual field of the second preview image to be the same with the overlapping visual field area; and
- in response to determining that the visual field of the first preview image and the visual field of the second preview image are the same with the overlapping visual field area, displaying a second prompting message for prompting that the visual field of the first preview image and the visual field of the second preview image are the same with the overlapping visual field area.

5. The photographing method according to claim 1, wherein the multi-terminal interconnection photographing instruction comprises a high dynamic range image generation instruction, and the high dynamic range image generation instruction is configured to control the one or more second photographing apparatuses to synchronously photograph a plurality of frames of images; and
the photographing method comprises:
- photographing images with different exposure ratios synchronously with the one or more second photographing apparatuses; and
- generating a high dynamic range image based on the images with different exposure ratios synchronously photographed by the first photographing apparatus and the one or more second photographing apparatuses.

6. The photographing method according to claim 5, wherein photographing the images with different exposure ratios synchronously with the one or more second photographing apparatuses comprises:
- receiving synchronization information fed back by the one or more second photographing apparatuses based on the high dynamic range image generation instruction;
- based on the synchronization information, determining the second photographing apparatuses photographing synchronously with the first photographing apparatus and the number of the second photographing apparatuses photographing synchronously with the first photographing apparatuses;
- determining different exposure ratio information required for generating the high dynamic range image based on the number;
- transmitting the different exposure ratio information to the second photographing apparatuses photographing synchronously with the first photographing apparatus respectively, wherein different second photographing apparatuses correspond to different exposure ratio information; and
- starting photographing applications of the first photographing apparatus and the second photographing apparatuses photographing synchronously with the first photographing apparatus, and synchronously photographing the images with different exposure ratios according to the respective exposure ratio information corresponding to the one or more second photographing apparatuses based on the photographing applications.

7. The photographing method according to claim 6, wherein based on the synchronization information, determining the second photographing apparatuses photographing synchronously with the first photographing apparatus comprises:
- acquiring a first preview image photographed by the photographing application of the first photographing apparatus, and determining a visual field of the first preview image;
- acquiring a visual field of a second preview image photographed by the photographing application of the one or more second photographing apparatuses, wherein the synchronization information comprises the visual field of the second preview image photographed by the photographing application of the one or more second photographing apparatuses; and
- determining the second photographing apparatus corresponding to the second preview image having the same visual field as the first preview image as the second photographing apparatus photographing synchronously with the first photographing apparatus.

8. The photographing method according to claim 7, wherein before determining the second photographing apparatus corresponding to the second preview image having the same visual field as the first preview image, the photographing method further comprises:
- determining an overlapping visual field area between the visual field of the first preview image and the visual field of the second preview image; and
- adjusting at least one of a position of the first photographing apparatus or a position of the one or more second photographing apparatuses based on the overlapping visual field area, to allow the visual field of the first preview image to be the same with the visual field of the second preview image.

9. A photographing method, applied to one or more second photographing apparatuses, comprising:
- in response to determining that a processing condition for multi-frame photographing is met, transmitting images to a first photographing apparatus respectively; and
- acquiring a photographed image transmitted by the first photographing apparatus after performing multi-frame fusion processing on the images transmitted by the one or more second photographing apparatuses,
wherein transmitting the images to the first photographing apparatus respectively comprises:
- in response to acquiring a multi-terminal interconnection photographing instruction transmitted by the first photographing apparatus, transmitting a multi-terminal interconnection photographing confirmation message to the first photographing apparatus, wherein the multi-terminal interconnection photographing instruction is configured for requesting the one or more second photographing apparatuses to photograph the images for the multi-frame fusion processing; and
- starting a photographing application of the one or more second photographing apparatuses, acquiring the images photographed by the one or more second photographing apparatuses synchronously with the first photographing apparatus, and transmitting the images photographed by the one or more second photographing apparatuses synchronously with the first photographing apparatus to the first photographing apparatus, wherein the multi-terminal interconnection photographing instruction comprises a high dynamic range image generation instruction, the high dynamic range image generation instruction is configured to control the one or more second photographing apparatuses to synchronously photograph a plurality of frames of images; and the photographing method comprises:

photographing images with different exposure ratios synchronously with the first photographing apparatus based on the high dynamic range image generation instruction; and transmitting the images with different exposure ratios photographed synchronously with the first photographing apparatus to the first photographing apparatus, wherein photographing the images with different exposure ratios synchronously with the first photographing apparatus based on the high dynamic range image generation instruction, comprises:

feeding back synchronization information to the first photographing apparatus based on the high dynamic range image generation instruction, wherein the synchronization information is configured for instructing a photographing application of the first photographing apparatus to control a photographing application of the one or more second photographing apparatuses via interconnection to synchronously photograph the images with different exposure ratios;

acquiring exposure ratio information transmitted by the first photographing apparatus, wherein the exposure ratio information is determined by the first photographing apparatus based on the number of the second photographing apparatuses photographing synchronously with the first photographing apparatus; and starting the photographing applications of the second photographing apparatuses photographing synchronously with the first photographing apparatus, and photographing the images with different exposure ratios synchronously with the first photographing apparatus according to the exposure ratio information based on the photographing applications.

10. The photographing method according to claim 9, wherein the multi-terminal interconnection photographing instruction comprises a depth information detection instruction, and the depth information detection instruction is configured to control the one or more second photographing apparatuses to synchronously photograph a plurality of frames of depth images; and the photographing method comprises:

photographing the plurality of frames of depth images synchronously with the first photographing apparatus based on the depth information detection instruction.

11. The photographing method according to claim 10, wherein photographing the plurality of frames of depth images synchronously with the first photographing apparatus based on the depth information detection instruction comprises:

feeding back synchronization information to the first photographing apparatus based on the depth information detection instruction, wherein the synchronization information is configured for instructing a photographing application of the first photographing apparatus to control a photographing application of the one or more second photographing apparatuses via interconnection to synchronously photographing the plurality of frames of depth images.

12. The photographing method according to claim 11, wherein feeding back the synchronization information to the first photographing apparatus based on the depth information detection instruction comprises:

based on the depth information detection instruction, transmitting intrinsic parameters of the one or more second photographing apparatuses to the first photographing apparatus respectively;

in response to receiving extrinsic parameters between the first photographing apparatus and the one or more second photographing apparatuses transmitted by the first photographing apparatus based on the intrinsic parameters of the one or more second photographing apparatuses, performing a camera calibration on the one or more second photographing apparatuses respectively; and transmitting the synchronization information to the first photographing apparatus after determining that the camera calibration of the one or more second photographing apparatuses is completed.

13. A photographing apparatus, comprising:

a processor; and a memory for storing instructions executable by the processor, wherein when the instructions are executed, the processor is configured to:

acquire images from one or more second photographing apparatuses respectively to obtain a plurality of frames of images, in response to determining that a processing condition for multi-frame photographing is met; and perform multi-frame fusion processing on the plurality of frames of images to obtain a photographed image, wherein in acquiring the images from the one or more second photographing apparatuses respectively to obtain the plurality of frames of images, the processor is further configured to:

transmit a multi-terminal interconnection photographing instruction to the one or more second photographing apparatuses, wherein the multi-terminal interconnection photographing instruction is configured for requesting the one or more second photographing apparatuses to photograph synchronously to obtain the plurality of frames of images, wherein the multi-terminal interconnection photographing instruction comprises a depth information detection instruction, and the depth information detection instruction is configured to control the one or more second photographing apparatuses to photograph a plurality of frames of depth images; and the processor is further configured to:

photograph a depth image synchronously with the one or more second photographing apparatuses; and perform image processing based on the depth images synchronously photographed by the first photographing apparatus and the one or more second photographing apparatuses, wherein in photographing the depth image synchronously with the one or more second photographing apparatuses, the processor is further configured to:

receive synchronization information fed back by the one or more second photographing apparatuses based on the depth information detection instruction; and based on the synchronization information, control by a photographing application of the first photographing apparatus a photographing application of the one or more second photographing apparatuses via interconnection to photograph the depth image synchronously with the one or more second photograph apparatuses, wherein in receiving the synchronization information fed back by the one or more second photographing apparatuses based on the depth information detection instruction the processor is further configured to:

receive intrinsic parameters of the one or more second photographing apparatuses respectively transmitted by the one or more second photographing apparatuses based on the depth information detection instruction;

determine extrinsic parameters between the first photographing apparatus and the one or more second photographing apparatuses based on intrinsic parameters of the first photographing apparatus and the intrinsic parameters of the one or more second photographing apparatuses, and perform a camera calibration on the first photographing apparatus;

transmit the extrinsic parameters between the first photographing apparatus and the one or more second photographing apparatuses to the one or more second photographing apparatuses respectively; and receive the synchronization information fed back by the one or more second photographing apparatuses after calibration based on the extrinsic parameters between the first photographing apparatus and the one or more second photographing apparatuses.

* * * * *